United States Patent

Haneda et al.

[11] Patent Number: 5,826,143
[45] Date of Patent: Oct. 20, 1998

[54] IMAGE FORMING APPARATUS WITH TWO TRANSFER MEANS

[75] Inventors: Satoshi Haneda; Kunio Shigeta; Yotaro Sato; Masakazu Fukuchi; Akitoshi Matsubara; Tadayoshi Ikeda, all of Hachioji, Japan

[73] Assignee: Konica Corporation, Tokyo, Japan

[21] Appl. No.: 821,877

[22] Filed: Mar. 21, 1997

[30] Foreign Application Priority Data

Mar. 26, 1996 [JP] Japan .................................. 8-070317
Mar. 26, 1996 [JP] Japan .................................. 8-070321

[51] Int. Cl.$^6$ .................................................. G03G 15/36
[52] U.S. Cl. ............................ 399/182; 399/45; 399/309
[58] Field of Search ................................ 399/16, 38, 45, 399/51, 66, 177, 182, 297, 299, 308, 309, 401

[56] References Cited

U.S. PATENT DOCUMENTS

| 5,138,389 | 8/1992 | Randall | 399/309 X |
| 5,414,522 | 5/1995 | Moriya | 399/45 X |
| 5,420,662 | 5/1995 | Gerstner | 399/309 X |
| 5,448,346 | 9/1995 | Tabata | 399/45 |
| 5,448,348 | 9/1995 | Azeta | 399/401 X |
| 5,488,456 | 1/1996 | Jamzadeh | 399/45 |
| 5,666,629 | 9/1997 | Kazoh | 399/401 |

FOREIGN PATENT DOCUMENTS

| 49-37538 | 10/1974 | Japan . |
| 54-28740 | 9/1979 | Japan . |
| 63-298255 | 12/1988 | Japan . |
| 64-44457 | 2/1989 | Japan . |
| 4-214576 | 8/1992 | Japan . |

Primary Examiner—Sandra L. Brase
Attorney, Agent, or Firm—Frishauf, Holtz, Goodman, Langer & Chick

[57] ABSTRACT

An image forming apparatus for forming images corresponding to image data of plural pages. The apparatus includes: a photoreceptor; a toner image former for forming a toner image on the photoreceptor in correspondence with the image data; a toner image receiving body for receiving the toner image from the toner image former and for carrying the toner image; the first transfer means for transferring the toner image on the photoreceptor onto one side surface of a transfer sheet; the second transfer means for transferring the toner image on the toner image receiving body onto the other side surface of the transfer sheet; a fixer for fixing the toner image, being transferred onto the transfer sheet, on the transfer sheet; a discharger, having plural discharging modes, for discharging the transfer sheet; and a control means for controlling the toner image former; wherein the control means arranges a combination of a first toner image formation onto the transfer sheet, being performed with the photoreceptor and the first transfer means, and second toner image formation onto the transfer sheet, being performed with the toner image receiving body and the second transfer means, in response to a given order of pages in the image data or to a discharging mode, selected from the discharging modes, of the discharger.

8 Claims, 17 Drawing Sheets

IMAGE FORMING APPARATUS WITH TWO TRANSFER MEANS

BACKGROUND OF THE INVENTION

The present invention relates to an electrophotographic type image forming apparatus such as a copier, a printer, a facsimile, or a similar apparatus, in which charging means, image exposure means, and developing means are arranged around an image carrier, and a toner image formed on the image carrier is transferred and fixed on a transfer material.

Conventionally, in an electrophotographic type image forming apparatus such as a copier, a printer, a facsimile, or a similar apparatus, when a transfer material is discharged after a toner image, formed on the image carrier, has been transferred and fixed onto a transfer material, a method is employed in which the transfer material is discharged with the toner image surface thereon facing upward (face-up), or with the toner image surface thereon facing downward (face-down).

Further, in double-sided copying operations, the following method is adopted: an image, formed on an image carrier, is transferred onto and fixed on a single surface of a transfer material; the transfer material is temporarily accommodated in a double-surface reversal sheet feeding device; the transfer material is sent from the double-surface reversal sheet feeding device in synchronization with an image, formed again on the image carrier; and the image is transferred onto and fixed on the other surface of the transfer material.

As described above, in this double-sided copying apparatus, the transfer material is conveyed in such a manner that it is sent to the double-surface reversal sheet feeding device, or it passes through a fixing device two times. Accordingly, conveyance reliability of the transfer material is low, and therefore, it is a cause of jamming. With respect to this, a method, in which both toner images are fixed at one time after they have been formed on the double surfaces of the transfer material, has been proposed in Japanese Patent Publication Nos. 37538/1974 and 28740/1979, and Japanese Patent Publication Open to Public Inspection Nos. 44457/1989, 214576/1992, etc. Specifically, in Japanese Patent Publication Open to Public Inspection Nos. 44457/1989, 214576/1992, etc., a method has been proposed in which a plural set of image forming means, comprising an image carrier, a charging means, an image exposure means, a developing means, etc., are arranged in parallel on a toner image receiving body, and a double-sided copy of a color image is formed.

However, in one image forming apparatus, when a transfer material is to be discharged with the toner image surface thereon facing upward (face-up), or with the toner image surface thereon facing downward (face-down), page sequence is out of order. Further, when the transfer order of image data is changed, or when the transfer order is regulated for any preceding pages or succeeding pages by an ADF, or a similar apparatus, due to the relationship of the transfer order of image data, page sequencing can not be reliably conducted, which is a major problem.

Further, in the double-sided color image formation proposed in the above Japanese Patent Publication Open to Public Inspection Nos. 44457/1989, 214576/1992, etc., although the conveyance reliability of the transfer material is increased, image deterioration such as color doubling, toner scattering, and friction damage, tends to occur, because several color toner images are superimposed on the toner image receiving body, one by one.

Further, in either single-sided and double-sided image formation, when a transfer material is conveyed, on the lower surface of which a toner image is formed, the toner image is rubbed in the conveyance section, resulting in an imperfect image.

The first object of the present invention is to solve the above problems and to provide an image forming apparatus in which transfer material is discharged without a complicated switching mechanism, and the toner image on the lower surface of the transfer material is not rubbed.

The second object of the present invention is to solve the following problems in which the direction of obverse and reverse images are recorded in the reverse direction, or a reverse image becomes a so-called mirror image when the left and right of the reverse image are reversed by re-transferring, depending on the document feeding direction, and further to provide an image forming apparatus in which an image identical to the document image is formed, without concerning that the obverse and reverse images formed on the transfer material are those of a longitudinal document or a lateral document.

SUMMARY OF THE INVENTION

An image forming apparatus to attain the first object of the present invention is the image forming apparatus having the following structure. That is, the apparatus has an image carrier; a toner image forming means for forming a toner image on the image carrier in correspondence with image data; a toner image receiving body to receive the toner image from the image carrier and to carry the toner image; the first transfer means for transferring the toner image on the image carrier onto one side surface of the transfer material; the second transfer means for transferring the toner image on the toner image receiving body onto the other side surface of the transfer material; a fixing means for fixing the toner image which has been transferred onto the transfer material, on the transfer material; a discharging means, having plural discharging modes, for discharging the transfer material; and a control means for controlling the toner image forming means.

Herein, the control means arranges a combination of a toner image formation onto the transfer material, being performed with the image carrier and the first transfer means, and a toner image formation onto the transfer material, being performed with the toner image receiving body and the second transfer means, in responce to the given page order in the image data or to a discharging mode, selected form the plural discharging modes, of the discharging means.

An image forming apparatus of the present invention to attain the second object is the image forming apparatus having the following strucutre. That is, the image forming apparatus has an image carrier; a toner image forming means for forming a toner image on the image carrier based on image data; a toner image receiving body to receive the toner image from the image carrier and to carry the toner image; the first transfer means for transferring the toner image on the image carrier onto one side surface of the transfer material; the second transfer means for transferring the toner image on the toner image receiving body onto the other side surface of the transfer material; a fixing means for fixing the toner image which has been transferred onto the transfer material, onto the transfer material; a control means for controlling the toner image forming means; and a discriminating means for discriminating whether an image to be outputted, is vertically formed on the transfer material or laterally formed on the transfer material in relation to the conveyance direction of the transfer material.

Herein, the control means changes the direction of image data to the reverse direction in relation to the primary scanning direction or the subsidiary scanning direction of a scanning means of the toner image forming means, corresponding to the result of the discrimination by the discriminating means, when the toner image is formed on the other surface of the transfer material by the toner image receiving body and the second transfer means.

DETAILED DESCRIPTION OF THE INVENTION

Figure 1:
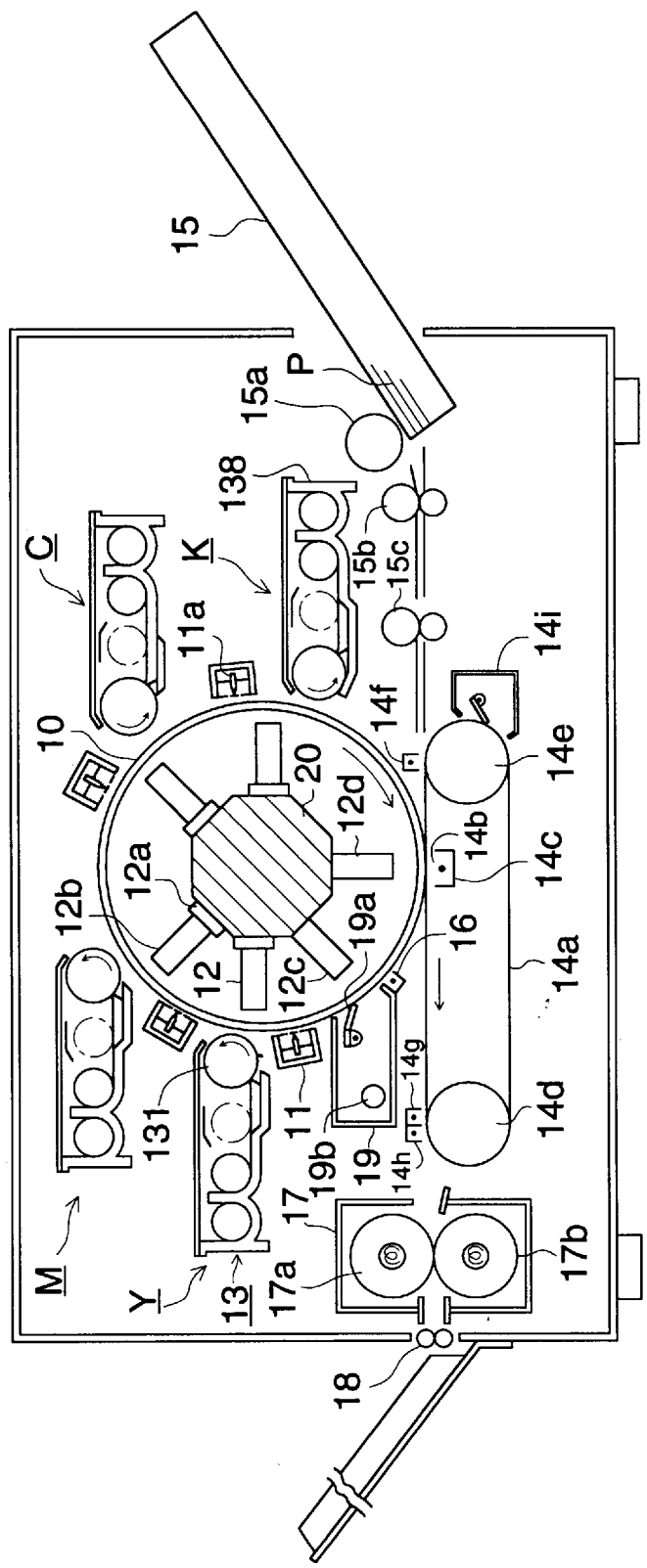
FIG. 1 is a sectional view of the structure of a color image forming apparatus of the first example of an image forming apparatus of the present invention.
Figure 2:
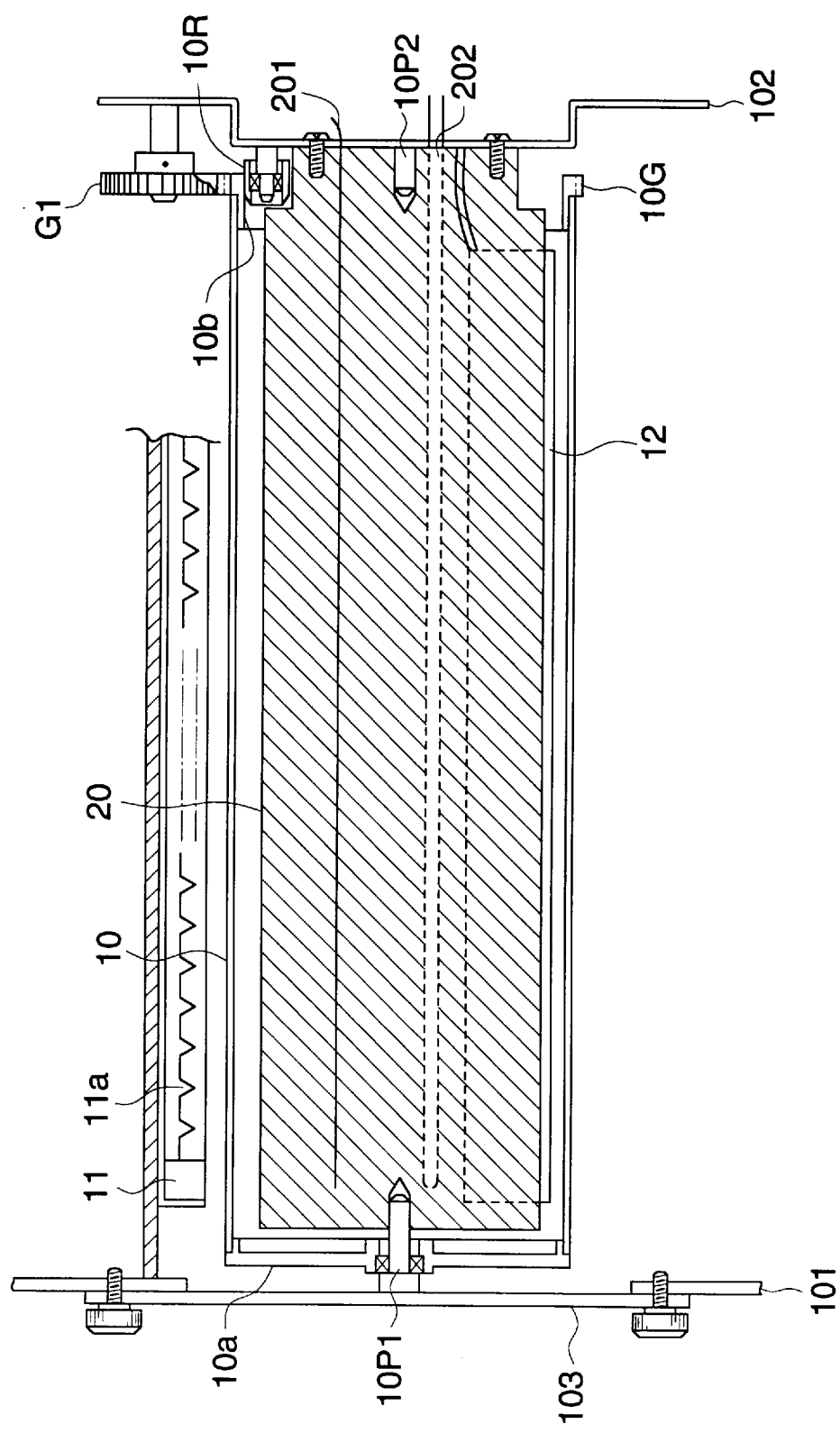
FIG. 2 is a side sectional view of an image carrier in FIG. 1.
Figure 3:
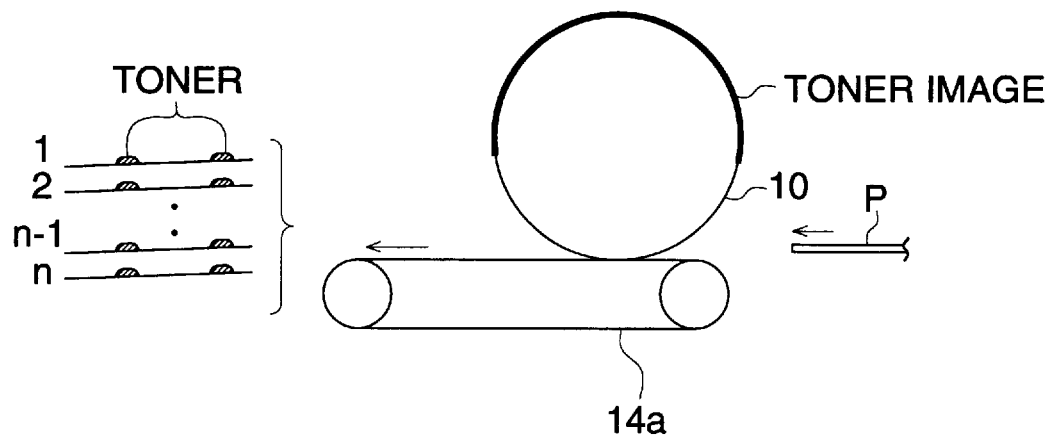
FIG. 3 is a view showing an image forming condition in the first mode.
Figure 4:
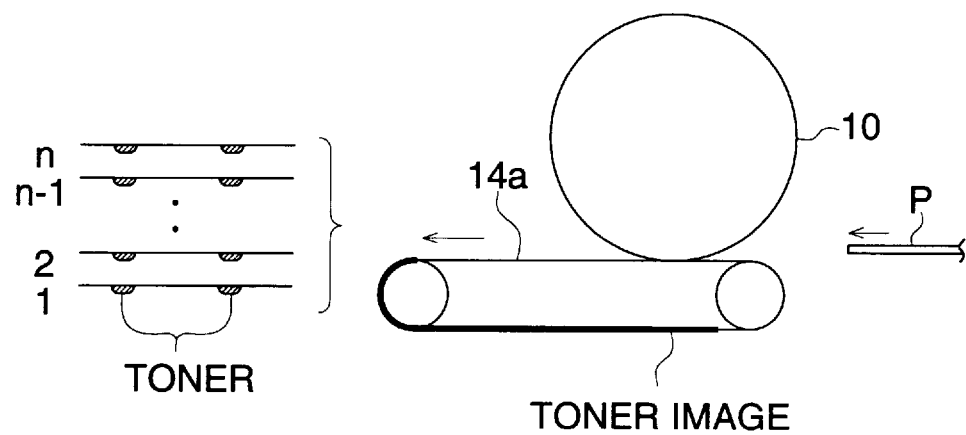
FIG. 4 is a view showing an image forming condition in the second mode.
Figure 5:
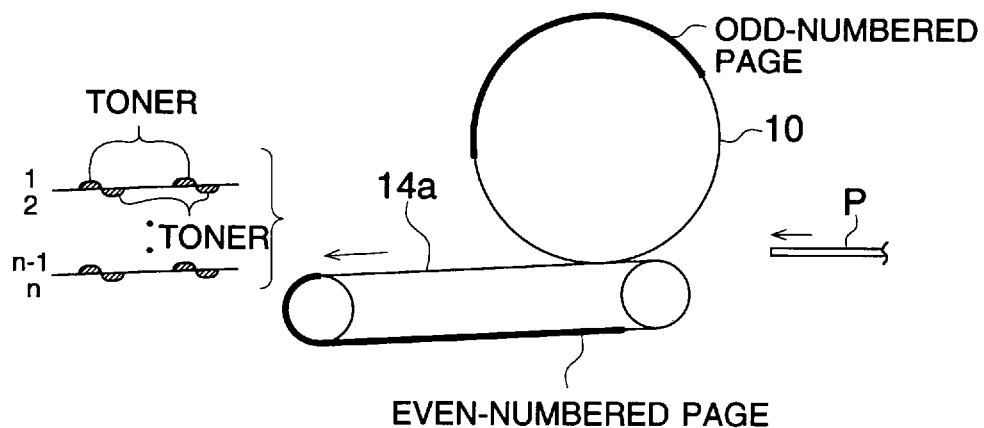
FIGS. 5(A) and 5(B) are views showing double-sided image forming conditions according to the third and fourth modes.
Figure 5:
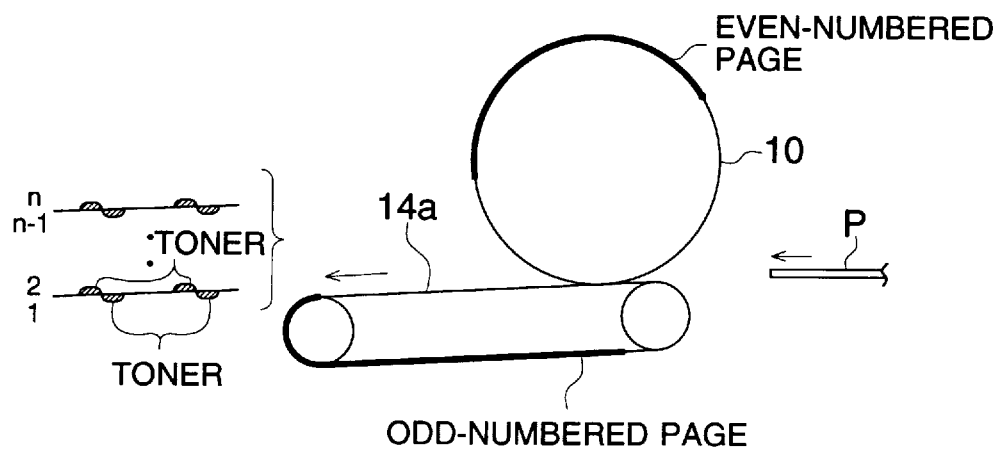
Figure 6:
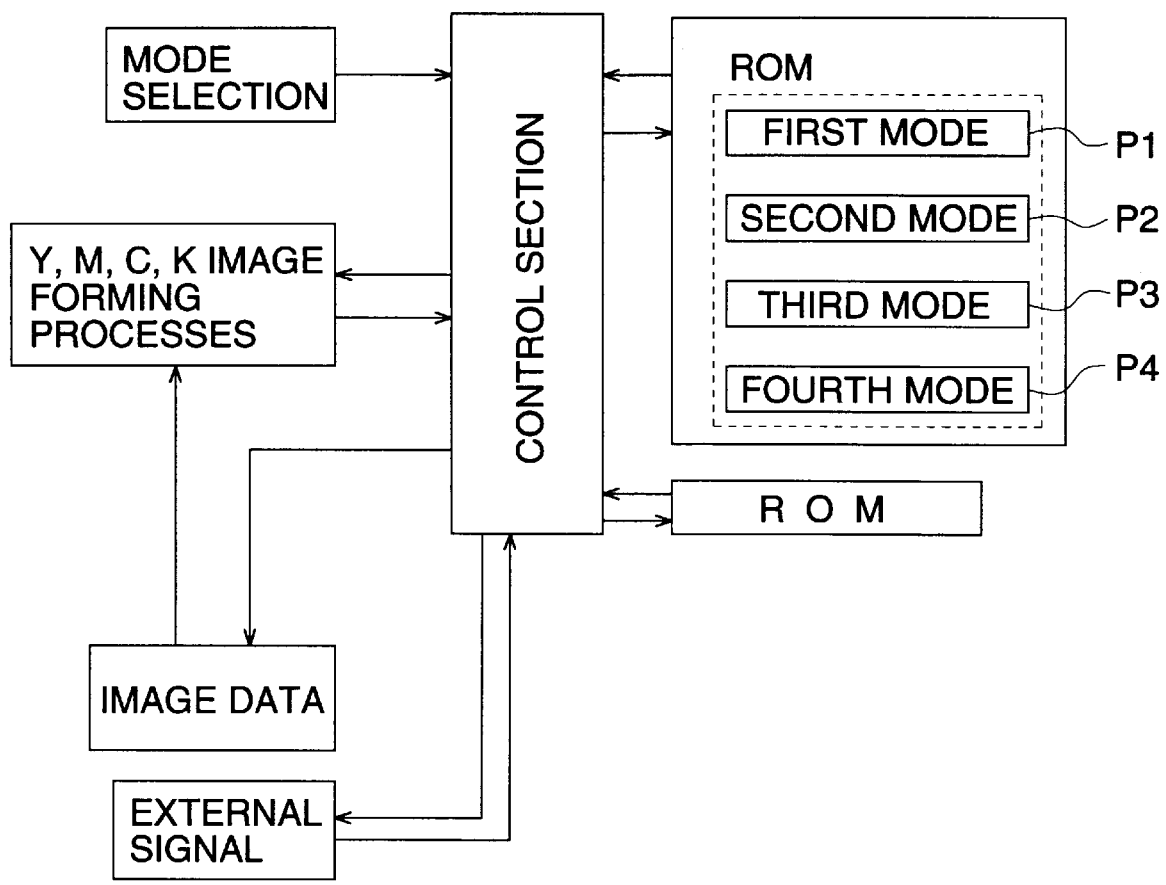
FIG. 6 is a circuit block diagram showing each type of mode selection in the color image forming apparatus of the first example.
Figure 7:
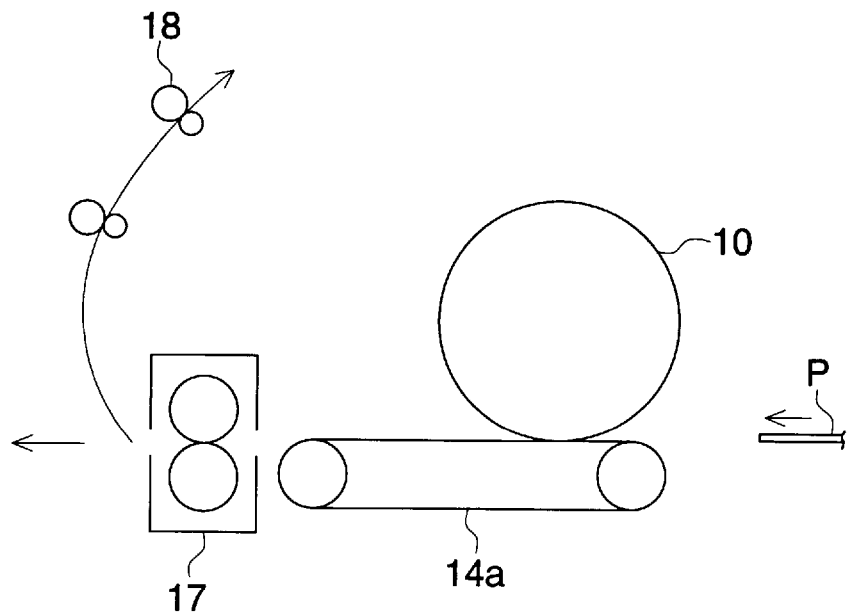
FIG. 7 is a view showing another example of the discharging method.

Referring to a color image forming apparatus shown in FIGS. 1 to 7, the image forming processes and each mechanism of the first example of an image forming apparatus of the present invention will be described below. FIG. 1 is a sectional view of the structure of a color image forming apparatus of the first example of an image forming apparatus of the present invention. FIG. 2 is a side sectional view of an image carrier in FIG. 1. FIG. 3 is a view showing an image forming condition in the first mode. FIG. 4 is a view showing an image forming condition in the second mode. FIG. 5 is a view showing double-sided image forming conditions according to the third and fourth modes. FIG. 5(A) is a view showing an example of double-sided image formation, and FIG. 5(B) is a view showing another example of the double-sided image formation. FIG. 6 is a circuit block diagram showing each type of mode selection in the color image forming apparatus of the first example. FIG. 7 is a view showing another example of a discharging method.

As shown in FIG. 6, the first through the fourth modes of image forming methods of the following color image forming apparatus are respectively selected. When the output order of pages is designated or the mode of face-down/face-up sheet discharge is selected by an external signal to designate the transfer order of image data, or by operations in an operation section of the apparatus main body, a single mode selected from a program P1, stored in a ROM, corresponding to the first mode, a program P2 corresponding to the second mode, a program P3 corresponding to the third mode, and a program P4 corresponding to the fourth mode, is read out in a RAM through a control section, and process control and operations of the color image forming apparatus are carried out.

Initially, the first mode will be described below, referring to FIGS. 1 through 3.

A photoreceptor drum 10, which is an image carrier, is provided inside with a cylindrical base body formed of a transparent member of, for example, glass or transparent acrylic resin, and is also provided with a transparent conductive layer, and a photoreceptor layer such as an a-Si layer, an organic photoreceptor layer (OPC), etc., on the outer periphery of the cited base body.

The photoreceptor drum 10 is mounted between a front flange 10a and a rear flange 10b; the front flange 10a is pivoted by a guide pin 10P1 provided on a cover 103, attached to a front side plate 101 of the apparatus main body; the rear flange 10b is engaged on the outer surface of a plurality of guide rollers 10R, provided on a rear side plate 102 of the apparatus main body; and thereby the photoreceptor drum 10 is held. A gear 10G, provided on the outer periphery of the rear flange 10b, is engaged with a driving gear G1, and by its driving power, the photoreceptor drum 10 is rotated clockwise as shown in FIG. 1, while the transparent conductive layer is electrically grounded.

In the present example, the transparent base body may have only an amount of exposure, which can form an appropriate contrast on a light conductive layer of the photoreceptor drum. Accordingly, it is not necessary that the light transparency factor of a transparent base body of the photoreceptor drum be 100%, but may have a characteristic in which some amount of light is absorbed at the time of transmission of the exposure beam. As light transmissive base body materials, acrylic resins, specifically, polymers incorporating a methyl methacrylate monomer, are excellent for the transparency, strength, accuracy, surface property, etc., and are preferably used. Further, any type of light transmissive resins such as acryl, fluorine, polyester, polycarbonate, polyethylene terephthalate, etc., which are used for general optical members, may be used. The material may even be colored if it still has light permeability with respect to the exposure light beams. As a light conductive layer, indium, tin oxide (ITO), lead oxide, indium oxide, copper iodide, or a metallic film, in which light permeability is still maintained, and which is formed of Au, Ag, Ni, Al, etc., can be used. As film forming methods, a vacuum deposition method, an activated reaction deposition method, any type of spattering method, any type of CVD method, any dip coating method, any spray coating method, etc., can be used. As light conductive layers, an amorphous silicon (a-Si) alloy photoreceptor layer, an amorphous selenium alloy photoreceptor layer, or any type of organic photoreceptor layer (OPC), can be used.

A scorotron charger 11, which is a charging means, is used for image forming processes of each color of yellow (Y), magenta (M), cyan (C) and black (K). The charger is mounted in the direction perpendicular to the moving direction of the photoreceptor drum 10 which is an image carrier, and opposed to the photoreceptor drum 10; and it charges (negative charging in the present example) the organic photoreceptor layer on the photoreceptor drum 10 by a corona discharge with the same polarity as the toner, by using a control grid having a predetermined potential voltage and, for example, a saw tooth type electrode as a discharge electrode 11a, so that a uniform potential voltage is applied onto the photoreceptor drum 10. As the discharge electrode 11a, a wire electrode can also be used instead of the above cited electrode.

An exposure unit 12, as an image exposure means for each color, is arranged in such a manner that the exposure position on the photoreceptor drum 10 is set upstream in the rotational direction of the photoreceptor drum with respect to a developing sleeve 131, between the corona discharge electrode 11a of the scorotron charger 11 and the developing position of a developing device 13.

An exposure unit 12 is structured as a unit for the exposure, onto which a linear exposure element 12a, in which a plurality of LEDs (light emitting diodes) 121 as a light emitting element for image exposure lights are arrayed, and a Selfoc lens 12b as a life-sized image forming element, are attached onto a holder (not shown), wherein the LEDs and the Selfoc lens are arranged in the primary scanning direction parallel to the axis of the photoreceptor drum 10. The exposure unit 12 for each color, a uniform exposure device 12c and a transfer-simultaneous exposure device 12d are attached onto a cylindrical holding member 20 which is fixed by being guided by a guide pin 10P2, provided on a rear side plate 102 of the apparatus main body, and another guide pin 10P1, provided on a cover 103 attached on a front side plate 101, and is accommodated inside the base body of the photoreceptor drum 10. Image data for each color, which has been read by an image reading apparatus, provided separately from the apparatus maim body, and stored in a memory, is sequentially read from the memory and respectively inputted into the exposure unit 12 for each color as electrical signals.

As the exposure elements, a linear exposure element in which a plurality of light emitting elements such as Fls (fluorescent material emission elements), Els (electroluminescence elements), PLs (plasma discharge elements), LEDs (light emitting diodes), etc., are aligned array-like, is used other than the above-described elements. The wavelength of light emission of the light emitting elements used in the present invention is preferable in the range of 680–900 nm, in which the permeability of Y, M, C toners is normally high. However, because image exposure is carried out from the rear surface of the photoreceptor drum, the shorter wavelength, which has insufficient transparency for color toner, may be used.

Regarding color sequence of the image formation, the developing devices, provided around the rotating photoreceptor drum according to the color sequence, are arranged in the present example as follows: with respect to the rotational direction of the photoreceptor drum 10 shown by an arrow in FIG. 1, the Y and M developing devices 13 are arranged on the left side of the photoreceptor drum 10; the C and K developing devices are arranged on the right side of the photoreceptor drum 10; the Y and M scorotron chargers 11 are arranged below developing casings 138 of the Y and M developing devices; and the C and K scorotron chargers 11 are arranged above developing casings 138 of the C and K developing devices.

The developing devices 13, which are developing means for each color, respectively accommodate one-component or two-component developers for yellow (Y), magenta (M), cyan (C) and black (K), and are provided with developing sleeves 131, formed of, for example, cylindrical non-magnetic stainless steel or aluminium material of 0.5–1 mm thickness, and of 15–25 mm outer diameter, developing sleeves being respectively rotated in the same direction as the photoreceptor drum 10 at the developing position, while keeping a predetermined gap with respect to the peripheral surface of the photoreceptor drum 10.

The developing device 13 is maintained to be in non-contact with the photoreceptor drum 10 by a roller, not shown, while keeping a predetermined gap, for example, of 100–1000 $\mu$m. At a developing operation by the developing device 13 for each color, a developing bias voltage of a DC voltage, or further an AC voltage AC in addition to the DC voltage, is applied on the developing sleeve 131; jumping development is carried out by the one-component or two-component developer accommodated in the developing device; a DC bias voltage having the same polarity as the toner (negative polarity in the present example), is applied on the negatively charged photoreceptor drum 10 in which a transparent conductive layer is grounded; and non-contact reversal development is carried out by toner adhering onto the exposure section.

The developing device 13 for each color reversal develops an electrostatic latent image on the photoreceptor drum 10, which is formed by charge of the scorotron charger 11 and image exposure by the exposure unit 12, in a no-contact condition, by the non-contact development method by application of a development bias voltage, by using toner having the same polarity as the charged polarity (in the present example, the photoreceptor drum is negatively charged, and the polarity of toner is also negative).

Images read by image pick-up elements of an image reading apparatus, separated from the present apparatus, or images edited by a computer, as a document image, are temporarily stored in a memory as image data for each color of Y, M, C and K.

A photoreceptor driving motor, not shown, is started at the start of image recording; a gear 10G provided on a rear flange 10b of the photoreceptor drum 10 is rotated through a driving gear G1; the photoreceptor drum 10 is rotated clockwise as shown by the arrow in FIG. 1; and simultaneously, application of potential voltage is started on the photoreceptor drum 10 by the charging operation of the Y scorotron charger 11, which is located below the developing casing 138 of the yellow (Y) developing device 13, located to the left of the photoreceptor drum 10.

After application of the potential voltage on the photoreceptor drum 10, exposure by electrical signals corresponding to the first color signal, that is, Y image data, is started by the Y exposure unit 12, and an electrostatic latent image is formed on the photoreceptor layer of the photoreceptor drum 10 corresponding to the Y image of the document image by rotational scanning of the drum.

The latent image is reversal-developed by the Y developing device 13 under non-contact condition of developer on the developing sleeve, and a yellow (Y) toner image is formed on the photoreceptor drum 10 corresponding to its rotation.

Next, potential voltage is applied on the yellow (Y) toner image formed on the photoreceptor drum 10, by the charging operation of the scorotron charger 11 for magenta (M) which is located on the left of the photoreceptor drum 10, above the developing device 13 for yellow(Y), and below the developing casing 138 of the developing device 13 for magenta (M); exposure is carried out by electrical signals corresponding to the second color signal of the exposure unit 12, that is, image data of M; and then, the magenta (M) toner image is formed by successively being superimposed on the yellow (Y) toner image by the non-contact reversal development by the developing device 13 for M.

Further, in the same process, the cyan (C) toner image corresponding to the third color signal is formed by the scorotron charger 11 for cyan (C), located on the right of the photoreceptor drum 10 and above the developing casing 138 of the developing device 13 for cyan (C), the exposure unit 12 for C, and the developing device 13 for C; and the black (K) toner image corresponding to the fourth color signal is successively formed by being superimposed on other toner images by the scorotron charger 11 for black (K), located on the right of the photoreceptor drum 10, below the developing device for C and above the developing casing 138 of the developing device 13 for black (K), the exposure unit 12 and developing device 13; and a full color toner image is formed on the peripheral surface of the photoreceptor drum 10 during a single rotation (the toner image forming means).

The exposure onto the organic photoreceptor layer of the photoreceptor drum 10 by the exposure units 12 for Y, M, C and K is carried out from the inside of the drum through the transparent base body. Accordingly, the exposure for the image corresponding to the second, third and forth color signals is carried out without influence of the previously formed toner images, so that the electrostatic latent image similar to the image corresponding to the first color signal ban be formed. In this connection, temperature and the temperature rise inside the photoreceptor drum 10 caused by heat generation of the exposure optical systems 12, can be stabilized or prevented, and suppressed to an acceptable degree by countermeasures in which a good heat conductivity material is used for the holding member 20; a heater 201 is used when the interior temperature is low; heat is radiated outside through a heat pipe 202 when the interior temperature is high, or by similar means.

A recording sheet P, which is a transfer material, is sent from a sheet feed cassette 15, which is a transfer material accommodation means, by a feed roller 15a, and fed and conveyed to a timing roller 15c by a sheet feed roller 15b.

The recording sheet P is sent to the transfer area 14b by the timing roller 15c in synchronization with the color toner image, which is carried on the photoreceptor drum 10 (the first image carrier means), and which is formed by the toner image forming means, and is conveyed and sent to the transfer area 14b by the toner image receiving body 14a, which is stretched between the driving roller 14d and the driven roller 14e, and is provided close to the photoreceptor drum 10 or in contact with the drum. In this case, the recording sheet P is paper-charged to the same polarity as the toner by a paper charger 14f, is attracted to the toner image receiving body 14a, and is sent to the transfer area 14b. By paper-charging the recording sheet P to the same polarity as the toner, it prevents the recording sheet P to be attracted to each other by the toner image on the toner image receiving body, or the toner image on the image carrier, so that the toner image is not disturbed.

The color toner images carried on the peripheral surface of the photoreceptor drum 10 are collectively transferred onto the upper surface side of the recording sheet P by the transfer device 14c which applies voltage with reversed polarity to the toner (in the present example, positive polarity), (the first transfer means). At the time of transferring by the transfer device 14c, uniform exposure by the transfer simultaneous exposure device 12d using, for example, a light emitting diode, which is provided inside the photoreceptor drum 10 opposed to the transfer device 14c, is carried out so that excellent transferring can be carried out.

Because a toner image for each color is superimposed on previous ones, it is preferable for the collective transfer, that the upper layer and the lower layer of the toner layer are charged by the same charging amount and with the same polarity. For this reason, the double-surface image formation, in which the polarity of the color toner image formed on the toner image receiving body 14a is reversed by corona charging, or in which the polarity of the color toner image formed on the image carrier is reversed by corona charging, is not preferable because the lower layer toner is not sufficiently charged with the same polarity, resulting in inadequate transfer.

It is preferable for an increase of the transfer property of the reversal image formation that the reversal development is repeated on the image carrier; the color toner image with the same polarity formed by superimposition, is collectively transferred onto the toner image receiving body 14a while the polarity is not changed; and next, it is collectively transferred onto the recording sheet P while the polarity is not changed. Also for the obverse image formation, it is preferable that the reversal development is repeated on the image carrier, and the color toner image with the same polarity formed by superimposition, is collectively transferred onto the recording sheet P while the polarity is not changed, for an increase of the transfer property of the obverse image formation.

From the above description, in the full color image formation, the double-surface image formation method is preferably adopted in which the color toner image is formed on the obverse surface of the transfer material by operating the first transfer means, and next, the color toner image is formed on the reverse surface of the transfer material by operating the second transfer means, by using the above-described image formation method for both the obverse and reverse surfaces.

Toner image receiving body 14a is a 0.5–2.0 mm thick endless rubber belt, and is structured of 2 layers of a semiconductive base body, having a resistance value of $10^8$–$10^{12}$ Ω·cm, which is formed of silicon rubber or urethane rubber, and a 5–50 μm thick fluorine coating layer as a toner filming prevention layer, formed outside the rubber base body. This layer is also preferably semi-conductive. Instead of the rubber belt base body, a 0.1–0.5 mm thick semi-conductive polyester, polystyrene, polyethylene, polyethylene terephthalate material, etc., may also be used.

Toner remaining on the peripheral surface of the photoreceptor drum 10, after transfer, is discharged by an image carrier AC discharger 16. Then, the toner is moved to a cleaning device 19, and is cleaned by a cleaning blade 19a made of a rubber material, which is in contact with the photoreceptor drum 10. Further, in order to eliminate the hysteresis of the photoreceptor due to the previous printing, the peripheral surface of the photoreceptor is discharged by a uniform exposure device 12c using, for example, a light emitting diode, before charging, so that electrical charges from the previous printing are eliminated, and following that, the next color image formation is conducted.

The recording sheet P, on the upper surface of which the color toner image has been formed, is discharged by a sheet separation AC discharger 14h for transfer material separation, separated from the toner image receiving body 14a, and is conveyed to a fixing device 17, composed of 2 rollers respectively housing a heater. Adhered toner on the recording sheet P is fixed by application of a heat and pressure between a fixing roller 17a and a pressure roller 17b; and the recording sheet P on the upper surface of which the image has been recorded, is sent by sheet discharge rollers 18 and discharged onto a tray provided outside the apparatus, with the toner image surface facing upward (face-up).

The image forming method by the first mode is described above. When a large number of sheets, for example, n sheets are copied by the first mode, image formation and discharging operations are carried out from the n-th sheet as shown in FIG. 3, and then, the first sheet is discharged onto the uppermost surface, with the color toner image surface facing upward. The above description represents a sheet discharging mode in which the transfer material, after transfer, is discharged without being reversed, and without any additional operation (the first sheet discharging mode).

Toner remaining on the peripheral surface of the toner image receiving body 14a after transferring, is removed by a toner image receiving body cleaning device 14i. Toner remaining on the peripheral surface of the photoreceptor drum 10 after transferring is discharged by an image carrier AC discharger 16; is then moved into the cleaning device 19; scraped off by a cleaning blade 19a, made of a rubber material, being in contact with the photoreceptor drum 10 into the cleaning device 19; and is collected into a waste toner container, not shown, by a screw 19b. The photoreceptor drum 10, from the surface of which the remaining toner has been removed by the cleaning device 19, is uniformly charged by the Y scorotron charger 11, and then enters into the next image formation cycle.

Next, an image formation method by the second mode will be described referring to FIGS. 4 and 1.

By the image forming processes by the toner image forming means described in the first mode, a superimposed color toner image is formed on the photoreceptor drum 10, which is the image carrier (the first image carrier mean). The superimposed color toner image on the photoreceptor drum 10 is collectively transferred onto a toner image receiving body 14a (the second image carrier means), which is stretched between the driving roller 14d and the driven roller 14e, and is provided close to the photoreceptor drum 10 or in contact with the drum, by the transfer device 14c for applying a voltage having reverse polarity of the toner, (positive polarity in the present example), in the transfer area 14b. At this time, in order to conduct an excellent transfer, the uniform exposure is carried out by the transfer simultaneous exposure device 12d using, for example, light emitting diodes. It is necessary to change image data so that the color toner image formed by the second mode at the time, forms a mirror image with respect to the color toner image formed by the first mode, on the image carrier.

Toner remaining on the peripheral surface of the photoreceptor drum 10, after transfer, is discharged by an image carrier AC discharger 16. Then, the toner is moved to a cleaning device 19, and is cleaned by a cleaning blade 19a made of a rubber material, which is in contact with the photoreceptor drum 10. Further, in order to eliminate the hysteresis of the photoreceptor due to the previous printing, the peripheral surface of the photoreceptor is discharged by a uniform exposure device 12c using, for example, a light emitting diode, before charging, so that electrical charges from the previous printing are eliminated, and following that, the next color image formation is conducted.

A recording sheet P, which is a transfer material, is sent from a sheet feed cassette 15, which is a transfer material accommodation means, by a feed roller 15a, and fed and conveyed to a timing roller 15c by a sheet feed roller 15b.

The recording sheet P is sent to the transfer area 14b by the timing roller 15c in synchronization with the color toner image carried on the toner image receiving body 14a. In this case, the recording sheet P is paper-charged to the same polarity as the toner by a paper charger 14f, is attracted to the toner image receiving body 14a, and is sent to the transfer area 14b. By paper-charging the recording sheet P to the same polarity as the toner, it prevents the recording sheet P to be attracted to each other by the toner image on the toner image receiving body, or the toner image on the image carrier, so that the toner image is not disturbed.

The toner image on the peripheral surface on the toner image receiving body 14a is collectively transferred onto the lower surface of the recording sheet P, by a reverse surface transfer device 14g which applies the voltage with reversed polarity as the toner (in the present example, positive polarity), (the second transfer means).

The recording sheet P, on the lower surface of which the color toner image has been formed, is discharged by a sheet separation AC discharger 14h for transfer material separation, separated from the toner image receiving body 14a, and is conveyed to a fixing device 17 as a fixing means, composed of 2 rollers respectively housing a heater. Adhered toner on the lower surface of the recording sheet P is fixed by application of a heat and pressure between a fixing roller 17a and a pressure roller 17b; and the recording sheet P, on the lower surface of which image has been recorded, is sent by sheet discharging rollers 18 and discharged onto a tray provided outside the apparatus, with the toner image surface facing downward (face-down).

The image forming method by the second mode is described above. When a plural number of sheets, for example, n sheets are copied by,the second mode, image formation and discharging operations are carried out from the first sheet as shown in FIG. 4, and then, n-th sheet is discharged onto the uppermost surface, with the color toner image surface facing downward.

Toner remaining on the peripheral surface of the toner image receiving body 14a after transferring, is removed by a toner image receiving body cleaning device 14i. Toner remaining on the peripheral surface of the photoreceptor drum 10 after transferring is discharged by an image carrier AC discharger 16; is then moved into the cleaning device 19; scraped off by a cleaning blade 19a, made of a rubber material, being in contact with the photoreceptor drum 10, into the cleaning device 19; and is collected into a waste toner container, not shown, by a screw 19b. The photoreceptor drum 10, from the surface of which the remaining toner has been removed by the cleaning device 19, is uniformly charged by the Y scorotron charger 11, and then enters into the next image formation cycle.

As described above, when the first mode is changed to the second mode, it is necessary that image data on the single surface forms a mirror image, and the output sequence of pages, in other words, the transfer sequence of image data is changed. That is, when transfer sequence of image data is designated or constrained, the first mode or the second mode is selected corresponding to the designation or the constraint.

Next, an image forming method by the third mode will be described referring to FIGS. 5(A) and 1.

By the image forming processes of the toner image forming means described in the first mode, a superimposed color toner image, which is a reverse surface image, is formed on the photoreceptor drum 10 (the first image carrier mean), which is the image carrier. The superimposed color toner image as the reverse surface image on the photoreceptor drum 10 is collectively transferred onto a toner image receiving body 14a (the second image carrier means), which is stretched between the driving roller 14d and the driven roller 14e, and is provided close to the photoreceptor drum 10 or in contact with the drum, by the transfer device 14c for applying a voltage having reverse polarity of the toner, (positive polarity in the present example), in the transfer area 14b. At this time, in order to conduct an excellent transfer, the uniform exposure is carried out by the transfer simultaneous exposure device 12d using, for example, light emitting diodes.

Toner remaining on the peripheral surface of the photoreceptor drum 10, after transfer, is discharged by an image carrier AC discharger 16. Then, the toner is moved to a cleaning device 19, and is cleaned by a cleaning blade 19a made of a rubber material, which is in contact with the photoreceptor drum 10. Further, in order to eliminate the hysteresis of the photoreceptor due to the previous printing, the peripheral surface of the photoreceptor is discharged by a uniform exposure device 12c using, for example, a light emitting diode, before charging, so that electrical charges from the previous printing are eliminated, and following that, the color image formation for the obverse image is conducted.

The obverse image of the superimposed color toner image by the toner image formation means is formed again on the photoreceptor drum 10, in synchronization with the reverse image formed on the toner receiving body 14a in the transfer area 14b. It is necessary to change image data so that the obverse image formed at the time, forms a mirror image with respect to the reverse image on the image carrier.

A recording sheet P, which is a transfer material, is sent from a sheet feed cassette 15, which is a transfer material accommodation means, by a feed roller 15a, and fed and conveyed to a timing roller 15c by a sheet feed roller 15b.

The recording sheet P is sent to the transfer area 14b by the timing roller 15c in synchronization with the color toner image as the obverse image carried on the photoreceptor drum 10, and the color toner image as the reverse image carried on the toner image receiving body 14a. In this case, the recording sheet P is paper-charged to the same polarity as the toner by a paper charger 14f, is attracted to the toner image receiving body 14a, and is sent to the transfer area 14b. By paper-charging the recording sheet P to the same polarity as the toner, it prevents the recording sheet P to be attracted to each other by the toner image on the toner image receiving body, or the toner image on the image carrier, so that the toner image is not disturbed.

The obverse image on the peripheral surface of the photoreceptor drum 10 is collectively transferred onto the upper surface side of the recording sheet P by the transfer device 14c which applies voltage with reversed polarity as the toner (in the present example, positive polarity), ( the first transfer means). In this case, the reverse image on the peripheral surface of the toner image receiving body 14a is not transferred onto the recording sheet P, and exists on the toner image receiving body 14a. Next, the reverse image on the peripheral surface on the toner image receiving body 14a is collectively transferred onto the lower surface of the recording sheet P, by a reverse surface transfer device 14g which has applied the voltage with reversed polarity as the toner (in the present example, positive polarity), (the second transfer means). At the time of transferring by the transfer device 14c, uniform exposure by the transfer simultaneous exposure device 12d using, for example, a light emitting diode, which is provided inside the photoreceptor drum 10 opposed to the transfer device 14c, is carried out so that excellent transferring can be carried out.

The recording sheet P, on the double-surfaces of which the color toner image has been formed, is discharged by a sheet separation AC discharger 14h for transfer material separation, separated from the toner image receiving body 14a, and is conveyed to a fixing device 17 as a fixing means, composed of 2 rollers respectively housing a heater. Adhered toner on the obverse and reverse sides of the recording sheet P is fixed by application of a heat and pressure between a fixing roller 17a and a pressure roller 17b; and the recording sheet P on both sides of which images have been recorded, is sent by sheet discharging rollers 18 and discharged onto a tray provided outside the apparatus.

The image forming method by the third mode is described above. When a large number of sheets, for example, n pages (n is an even number) are copied by the third mode, the following operations are carried out: as shown in FIG. 5(A), the color toner image on the odd numbered page formed on the photoreceptor drum 10, and the color toner image on the even numbered page formed on the toner image receiving body 14a, form double-sided images; image formation and discharging operations are conducted from the double-sided copy of n-th and (n−1)th pages, with the color toner image of n-th page facing downward; and the first copied sheet is discharged onto the uppermost surface, with the color toner image of the second page facing downward, and with the color toner image of the first page facing upward.

Toner remaining on the peripheral surface of the toner image receiving body 14a, after transferring, is removed by a toner image receiving body cleaning device 14i. Toner remaining on the peripheral surface of the photoreceptor drum 10 after the transfer operation is discharged by an image carrier AC discharger 16; is then moved into the cleaning device 19; scraped off by a cleaning blade 19a, made of a rubber material, being in contact with the photoreceptor drum 10, into the cleaning device 19; and is collected into a waste toner container, not shown, by a screw 19b. The photoreceptor drum 10, from the surface of which the remaining toner has been removed by the cleaning device 19, is uniformly charged by the Y scorotron charger 11, and then enters into the next image formation cycle.

In a similar manner, the image formation by the fourth mode is conducted as follows. When, for example, n pages (n is an even number) are copied by the fourth mode, the following operations are carried out: as shown in FIG. 5(B), the color toner image on the even-numbered page formed on the photoreceptor drum 10, and the color toner image on the odd-numbered page formed on the toner image receiving body 14a respectively form double-sided images; image formation and discharging operations are conducted from the double-sided copy of the second and the first pages, with as to form single surface image data as a mirror image, in other words, the transfer sequence of image data is changed. That is, the first mode→the second mode, the second mode→the first mode, or the third mode→the fourth mode, the fourth mode→the third mode, is selected corresponding to the discharging mode, in combination with the constraint or change of the transfer sequence of image data. Herein, four modes and operations of the first mode to the fourth mode are listed as Table 1.

TABLE 1

| | | Output sequence of images | First sheet delivery mode (non-reversal) | | Second sheet delivery mode (reversal) | |
|---|---|---|---|---|---|---|
| | Mode | | Obverse image formation | Reverse image formation | Obverse image formation | Reverse image formation |
| Single surface mode | mode 1 | n→→1 | Yes | No | No | Yes |
| Single surface mode | mode 2 | 1→→n | No | Yes | Yes | No |
| Double surface mode | mode 3 | n→→1 | odd-numbered page | even-numbered page | even-numbered page | odd-numbered page |
| Double surface mode | mode 4 | 1→→n | even-numbered page | odd-numbered page | odd-numbered page | even-numbered page | the color toner image of the first page facing downward; and the final copy sheet is discharged onto the uppermost surface, with the color toner image of the (n–1)th page facing downward, and with the color toner image of the n-th page facing upward.

As described above, when the third mode and the fourth mode are changed, it is necessary that image data on the single surface forms a mirror image, and the output sequence of pages, in other words, the transfer sequence of image data, is changed. That is, when transfer sequence of image data is designated or constrained, the third mode or the fourth mode is selected corresponding to the designation or the constraint.

By the above-described third and fourth double-sided image forming method, a conventional double-sided reversal sheet feeding apparatus is not necessary, and further, the transfer material may be passed through the fixing device only once, resulting in high conveyance reliability of the transfer material. Further, the superimposed color toner images are collectively transferred, and thereby, color-doubling, toner scattering, or frictional damage, etc., hardly occurs, so that excellent double-sided color image formation, with less image deterioration, can be conducted.

In the example shown in FIG. 7, the discharging port for the recording sheet P is switched, and after color toner images formed on the photoreceptor drum 10 and the toner image receiving body 14a have been transferred onto the recording sheet P, and the recording sheet P has passed through the fixing device 17, which is a fixing means, and fixed, it is reversed and conveyed, sent by the sheet discharging rollers 18, and is discharged onto a tray provided outside the apparatus (the second sheet discharging mode). As the discharging method, the obverse and reverse surfaces of the discharged recording sheet P are reversed, compared to the method described in FIGS. 3 to 5, and the output sequence of pages, described in FIGS. 3 to 5, is reversed. This will be detailed in Example 4.

Also, when the discharging mode is changed by the operator, it is necessary that the output sequence of pages so

EXAMPLE 2

Figure 8:
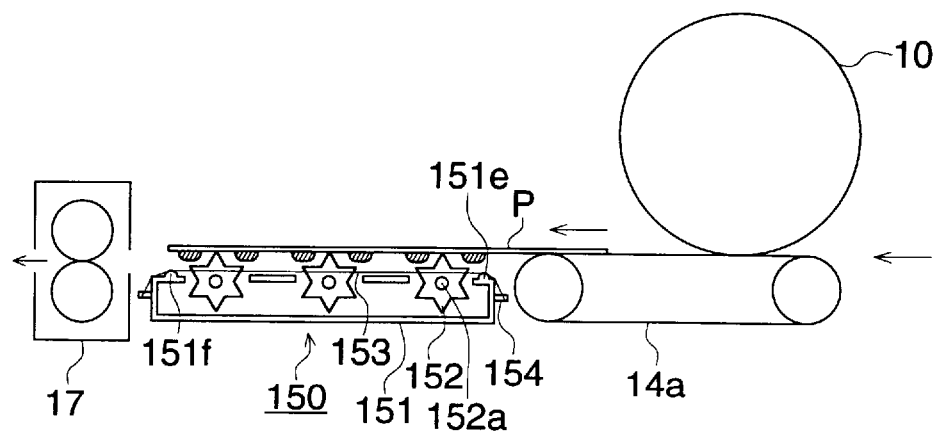
FIG. 8 is a view showing an example of a conveyance section.
Figure 9:
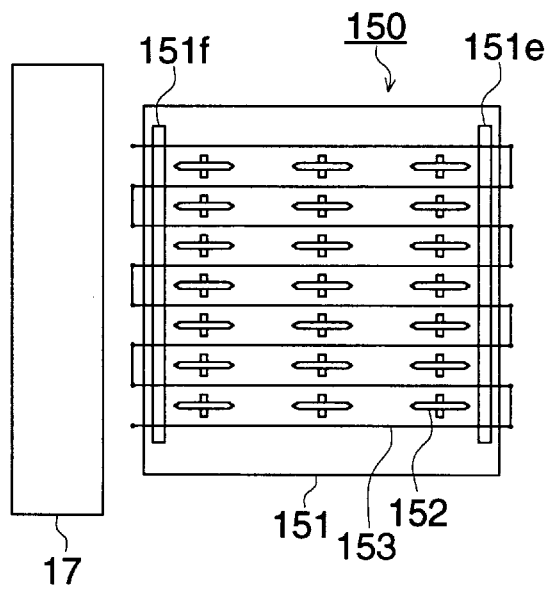
FIG. 9 is a plan view of the conveyance section of FIG. 8.
Figure 10:
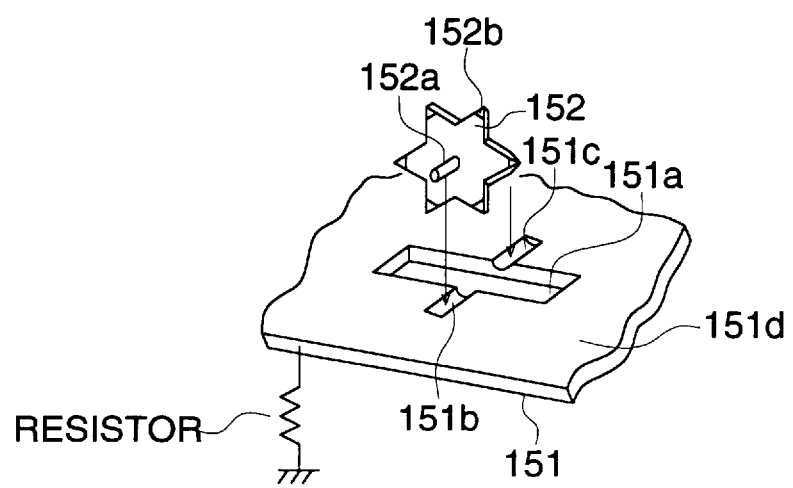
FIG. 10 is a perspective view of a spur wheel.
Figure 11:
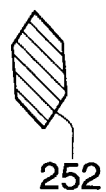
FIGS. 11(A) and 11(B) are views showing other examples of the spur wheel.
Figure 11:
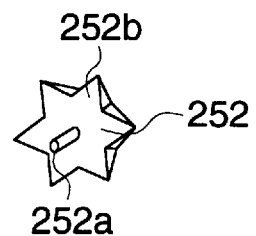
Figure 12:
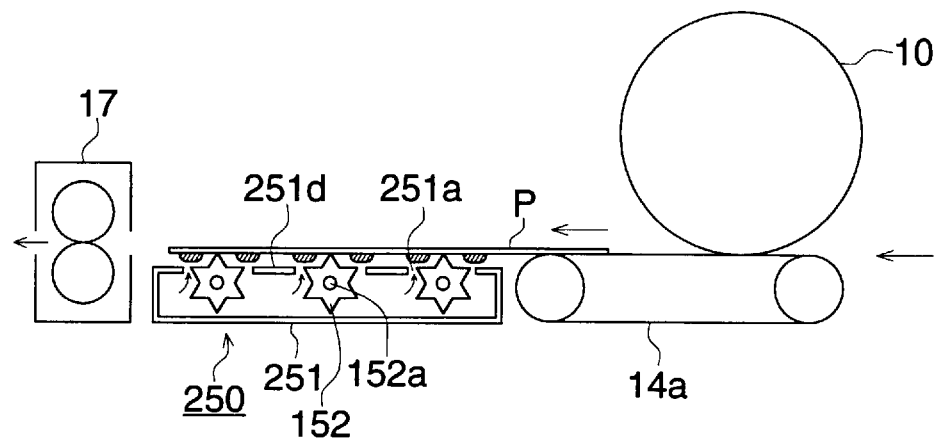
FIG. 12 is a view showing another example of the conveyance section.

Example 2 is structured in such a manner that a conveyance section is provided between the toner image receiving body and the fixing device of the color image forming apparatus described in Example 1. Example 2 will be described below referring to FIGS. 8 to 12. FIG. 8 is a view showing one example of the conveyance section, and FIG. 9 is a plan view of the conveyance section in FIG. 8. FIG. 10 is a perspective view of a spur wheel, FIG. 11 is a view showing another example of the spur wheel, FIG. 11(A) is a sectional view showing another example of the spur wheel, FIG. 11(B) is a perspective view showing another example of the spur wheel, and FIG. 12 is a view showing another example of the conveyance section. Members having the same function and structure as those in the first example, are denoted by the same numbers.

Color image formation is conducted in the same manner as in the color image forming apparatus described in the first example. A conveyance section 150 is provided between the toner image receiving body 14a and the fixing device 17 as the fixing means, and conveys the recording sheet P as the transfer material from the toner image receiving body 14a to the fixing device 17.

The conveyance section 150 is structured of a case 151, a plurality of spur wheels 152 provided in the case 151, and a wire 153 stretched above the case 151. A rectangular hole 151a is provided on the upper surface 151d of the case 151, and grooves 151b and 151c are respectively provided on both sides of the rectangular hole 151a. A spur wheel 152 is inserted into the rectangular hole 151a, and a support shaft 152a provided in the center of the spur wheel 152 is inserted into grooves 151b and 151c of both sides of the rectangular hole 151a, so that the spur wheel 152 is rotatably attached on the case 151. As shown in FIGS. 8 and 9, a wire 153 is stretched above the case 151 using pins 154. In this case, the wire 153, serving as a guide member, is stretched above the support shafts 152a, provided at the rotation center of the spur wheel 152, by protruding portions 151e and 151f of the case 151.

As shown in FIG. 10, the spur wheel is preferably structured as follows: dimensions of the spur wheel 152 is 0.05–0.5 mm thickness, and 5–25 mm outer diameter; and it is composed of a hexagonal plate-like member of 10 mm outer diameter, provided with protruded portions 152b with sharp leading edges, in which, for example, it is composed of etching processed metal plate such as 0.2 mm thick stainless steel plate, or copper plate, etc. This metal plate is electrically grounded through a resistor of $10^{10}$–$10^{-}\Omega$.

Further, as shown in FIG. 11, a member can also be used which has, for example, a sectional view like a counter on an abacus, which is molded of resin, and has a 5–25 mm outer diameter, and through which a support shaft 252a is provided on the hexagonal spur wheel 252, having protruding portions 252b with sharp leading edges. Further, as the shape of protruding portions of the spur wheel, shapes of other polygonal protruding portions such as pentagon, octagon, or decagon, may be used instead of hexagon. Preferably, this resin is electrically grounded using a resistance member having $10^{10}$–$10^{13}$ $\Omega \cdot$cm. The reason for the spur wheel 152 to be electrically grounded through a resistor with high resistance, or using a high resistance member, is that toner or a transfer member has electrical charges, and therefore, toner adhesion due to electrical charge accumulation or mirror image force is prevented by discharge in order to prevent toner images from being disturbed.

When the recording sheet P, onto which the toner image has been transferred, is conveyed to the conveyance section 150, the leading edge of the recording sheet P is elevated slightly by the wire 153 stretched above the support shafts 152a, provided at the rotation center of the spur wheel 152; the toner image is sent to the spur wheel 152 without being rubbed; the spur wheels 152 are driven, while the leading edge 152b of the spur wheel 152 is in contact with the recording sheet P or sticks into the recording sheet P; and the recording sheet P is conveyed to the fixing device 17. Further, the trailing edge of the recording sheet P is prevented from being lowered down by the wire 153 as the guide member, stretched above the support shafts 152a, through the rotation center of the spur wheel 152, so that the toner image is not rubbed. Even when the recording sheet P is conveyed, on the lower surface of which the toner image has been formed by the second, the third, and the fourth modes described in Example 1, the toner image is conveyed without being rubbed.

FIG. 12 shows another example of the conveyance section, in which the upper surface 251d of the case 251 is provided above the support shaft 152a of the spur wheel 152 as the guide member of the conveyance section 250. The leading edge of the recording sheet P is prevented from being slightly elevated, and the trailing edge of the recording sheet P is prevented from being lowered, so that the toner image is prevented from being rubbed.

Further, when an air flow is applied onto the lower surface of the recording sheet p, as the transfer material, as shown by an arrow, through the rectangular hole 251a of the case 251, lifting of the recording sheet P can also be supported.

EXAMPLE 3

Figure 13:
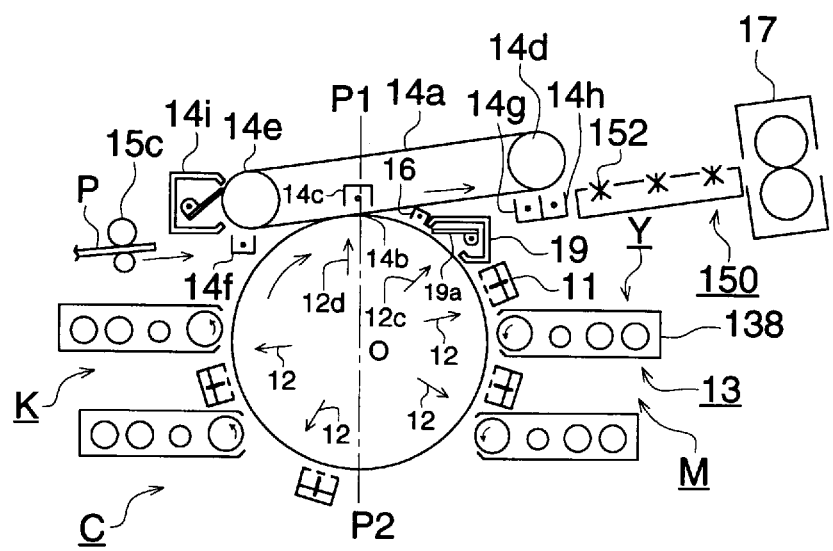
FIG. 13 is a sectional view of the structure of a color image forming apparatus according to the third example.

The present example is structured in the manner that the toner image receiving body is arranged above the image carrier in the color image forming apparatus described in Example 1. Referring to FIG. 13, the third example will be described below. FIG. 13 is a sectional view of the structure of a color image forming apparatus according to the third example. Members having the same functions and structures as those described in the first example, are denoted by the same numbers.

A photoreceptor drum 10, which is an image carrier, is provided inside with a cylindrical base body formed of a transparent member of, for example, glass or transparent acrylic resin, and is also provided with a transparent conductive layer, and a photoreceptor layer such as an a-Si layer, an organic photoreceptor layer (OPC), etc., on the outer periphery of the cited base body. The photoreceptor drum 10 is rotated clockwise as shown by an arrow in FIG. 13, while being electrically grounded. The toner image receiving body 14a is provided above the photoreceptor drum 10.

The exposure units as the image exposure means are respectively arranged outside the photoreceptor drum 10 as follows in the present example, according to the color sequence of the image formation in the rotational direction of the photoreceptor drum 10 shown by an arrow in FIG. 13: the Y and M exposure units 12 are arranged on the right side of the photoreceptor drum 10 (the right side of the longitudinal surface P1-O-P2, through the central axis O of the photoreceptor drum 10 in FIG. 13); and the C and K exposure units 12 are arranged on the left side of the photoreceptor drum 10 (the left side of the longitudinal surface P1-O-P2, through the central axis O of the photoreceptor drum 10 in FIG. 13).

As the developing means provided according to the color sequence of the image formation, the developing devices, provided outside the photoreceptor drum 10, are respectively arranged in the present example as follows, in the rotational direction of the photoreceptor drum 10 shown by an arrow in FIG. 13: the Y and M developing devices 13 are arranged on the right side of the photoreceptor drum 10 (the right side of the longitudinal surface P1-O-P2, through the central axis O of the photoreceptor drum 10 in FIG. 13); and the C and K developing devices are arranged on the left side of the photoreceptor drum 10 (the left side of the longitudinal surface P1-O-P2, through the central axis O of the photoreceptor drum 10 in FIG. 13). The Y and M scorotron chargers 11 are arranged above developing casings 138 of the Y and M developing devices; and the C and K scorotron chargers 11 are arranged below developing casings 138 of the C and K developing devices.

By the toner image forming means in the first to fourth modes described in Example 1, the color toner image is formed on the photoreceptor drum 10 (the first image carrier means) or the toner image receiving body 14a (the second image carrier means).

A recording sheet P, which is a transfer material, is fed from a sheet feed cassette, which is a transfer material accommodation means, and conveyed to a timing roller 15c.

The recording sheet P is sent to the transfer area 14b, in synchronization with the color toner image, which is carried on the photoreceptor drum 10 or toner image receiving body 14a, and which is formed by the first through the third modes, by the timing roller 15c, and is conveyed and sent to the transfer area 14b by the toner image receiving body 14a, which is stretched between the driving roller 14d and the driven roller 14e and is arranged above the photoreceptor drum 10, and which is provided close to the photoreceptor drum 10 or in contact with the drum. In this case, the recording sheet P is paper-charged to the same polarity as the toner by a paper charger 14f, is attracted to the toner image receiving body 14a, and is sent to the transfer area 14b. By paper-charging the recording sheet P to the same polarity as the toner, it prevents the recording sheet P to be attracted to each other by the toner image on the toner image receiving body, or the toner image on the image carrier, so that the toner image is not disturbed.

The color toner image carried on the peripheral surface of the photoreceptor drum 10 is collectively transferred onto the recording sheet P by the transfer device 14c which applies voltage with reversed polarity as the toner (in the present example, positive polarity), (the first transfer means). Further, in cases of the second and the third modes, the reverse toner image carried on the peripheral surface on the toner image receiving body 14a is collectively transferred onto the lower surface of the recording sheet P, by a reverse surface transfer device 14g which has applied the voltage with reversed polarity as the toner (in the present example, positive polarity), (the second transfer means). At the time of transferring by the transfer device 14c, uniform exposure by the transfer simultaneous exposure device 12d using, for example, a light emitting diode, which is provided inside the photoreceptor drum 10 opposed to the transfer device 14c, is carried out so that excellent transferring can be carried out. $\Omega$·cm, which is formed of silicon rubber or urethane rubber, and a 5–50 $\mu$m thick fluorine coating layer as a toner filming prevention layer, formed on the rubber base body. This layer is also preferably semi-conductive. Instead of the rubber belt base body, a 0.1–0.5 mm thick semi-conductive polyester, polystyrene, polyethylene, polyethylene terephthalate material, etc., may also be used.

Toner remaining on the peripheral surface of the photoreceptor drum 10, after transfer, is discharged by an image carrier AC discharger 16. Then, the toner is moved to a cleaning device 19, and is cleaned by a cleaning blade 19a made of a rubber material, which is in contact with the photoreceptor drum 10. Further, in order to eliminate the hysteresis of the photoreceptor due to the previous printing, the peripheral surface of the photoreceptor is discharged by a uniform exposure device 12c using, for example, a light emitting diode, before charging, so that electrical charges from the previous printing are eliminated, and following that, enters into the next color image formation.

The recording sheet P, on the surface of which the color toner image has been formed, is discharged by a sheet separation AC discharger 14h for transfer material separation, separated from the toner image receiving body 14a, and is conveyed to a fixing device 17 as a fixing means, composed of 2 rollers respectively housing a heater, through the conveyance section 150 in which the spur wheels 152, described in Example 2, are provided, so that the toner image, transferred onto the recording sheet P from the photoreceptor surface 10, is not rubbed. Adhered toner on the obverse and reverse sides of the recording sheet P is fixed by application of a heat and pressure between a fixing roller 17a and a pressure roller 17b, the recording sheet P on which the image has been recorded, is sent by sheet discharging rollers 18, and discharged onto a tray provided outside the apparatus. As a discharging method, the respective discharging methods, which have been described in FIGS. 3 to 5, and in which the obverse and the reverse surfaces are reversed, are employed according to each mode. Further, the conveyance section 150 may not always be provided.

Toner remaining on the peripheral surface of the toner image receiving body 14a after transferring, is removed by a toner image receiving body cleaning device 14i. Toner remaining on the peripheral surface of the photoreceptor drum 10 after transferring is discharged by an image carrier AC discharger 16; is then moved into the cleaning device 19; scraped off by a cleaning blade 19a, made of a rubber material, being in contact with the photoreceptor drum 10, into the cleaning device 19; and is collected into a waste toner container, not shown. The photoreceptor drum 10, from the surface of which the remaining toner has been removed by the cleaning device 19, is uniformly charged by the Y scorotron charger 11, and then enters into the next image formation cycle.

EXAMPLE 4

Figure 14:
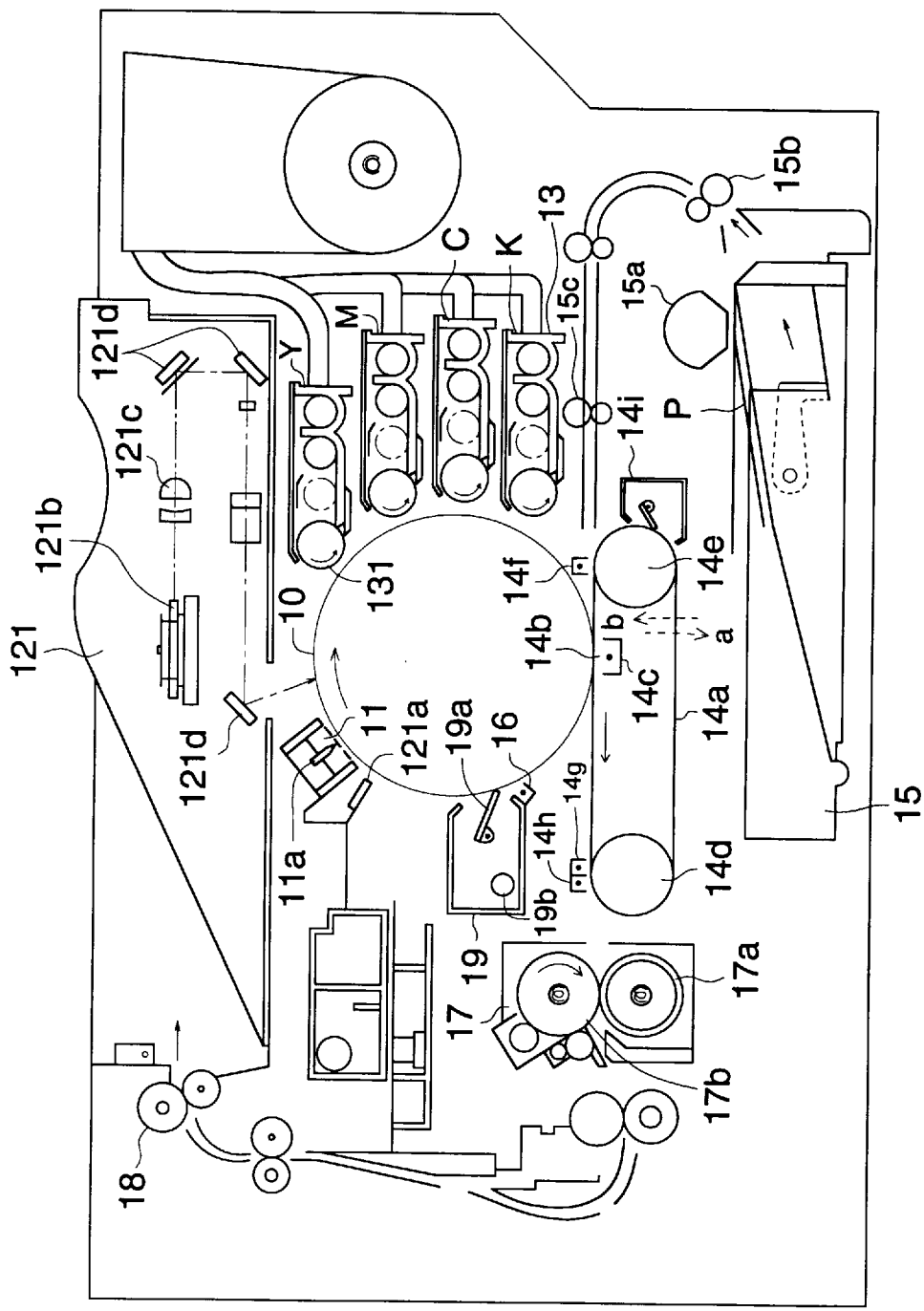
FIG. 14 is a sectional view of the structure of a color image forming apparatus of the fourth example of the image forming apparatus of the present invention.
Figure 15:
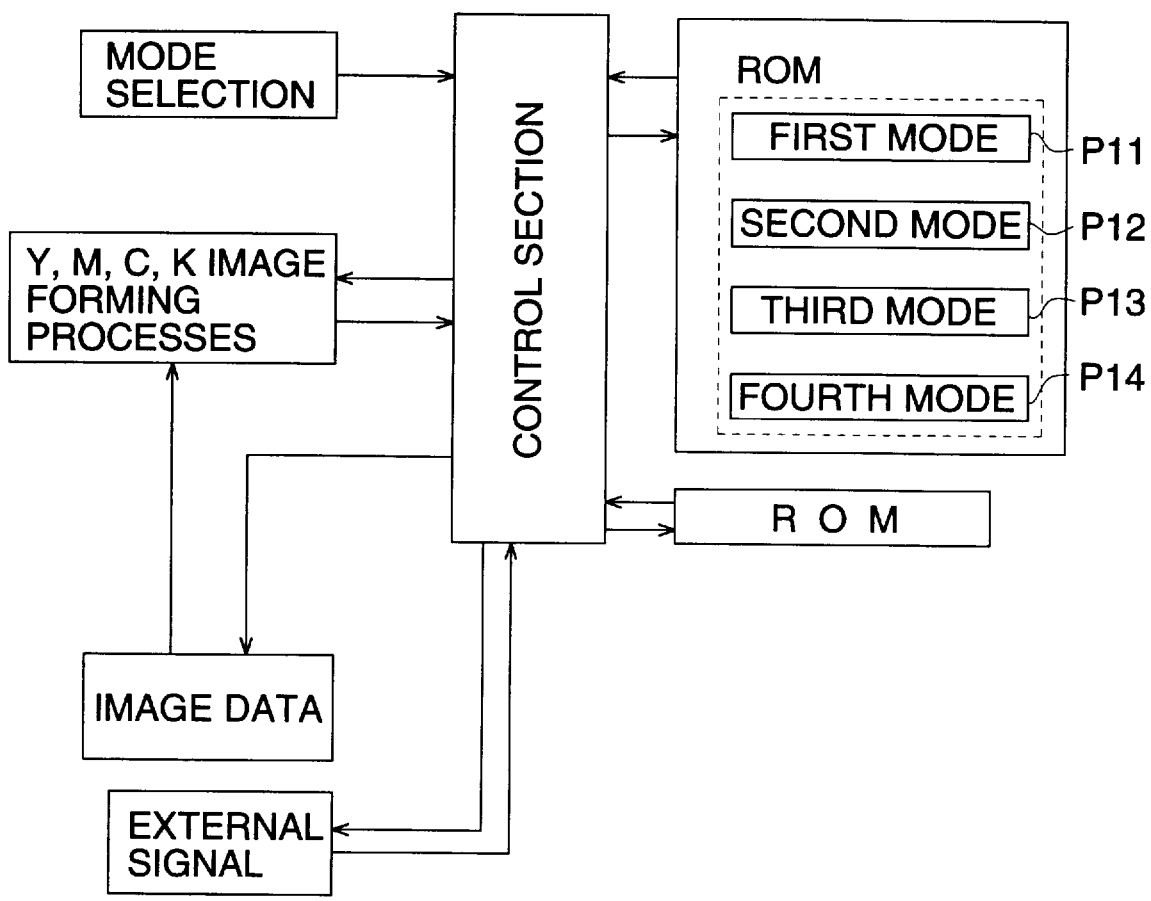
FIG. 15 is a circuit block diagram showing each type of mode selection in the color image forming apparatus of the fourth example.
Figure 16:
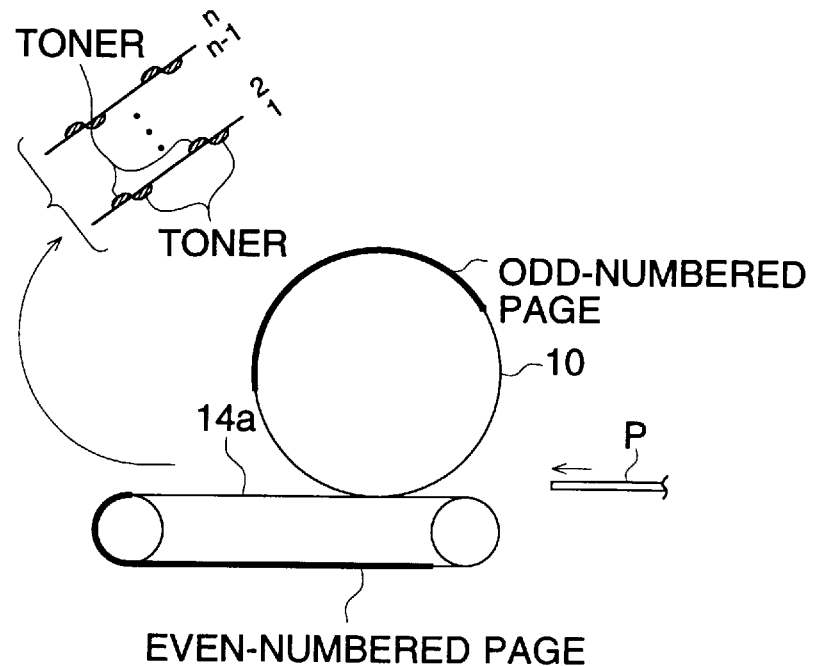
FIGS. 16(A) and 16(B) are views showing double-sided image forming conditions according to the third and fourth modes of the fourth example.
Figure 16:
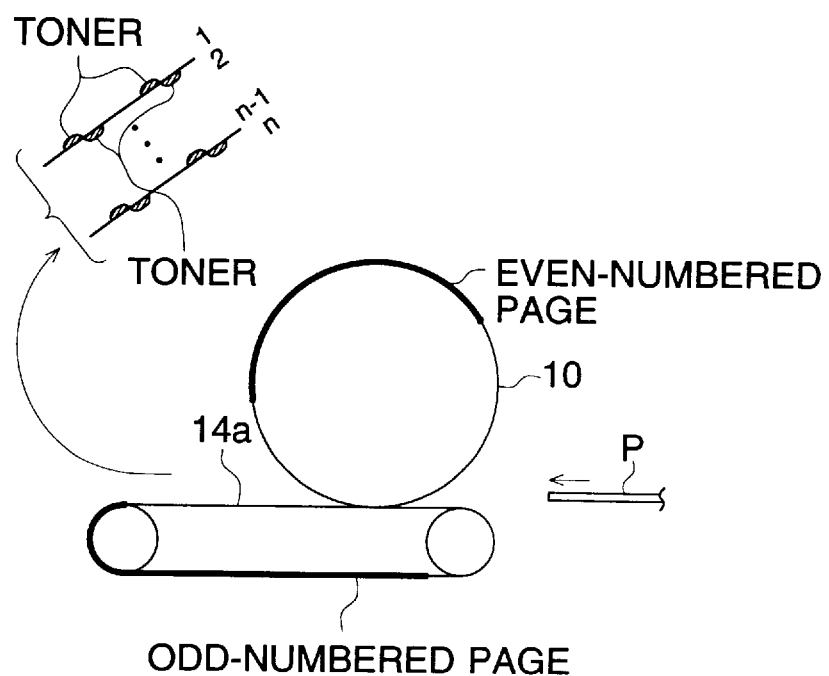

Referring to FIGS. 14 through 16, image forming processes and each mechanism of the fourth example of an image forming apparatus of the present invention will be described below. FIG. 14 is a sectional view of the structure of a color image forming apparatus of the fourth example of an image forming apparatus of the present invention. FIG. 15 is a circuit block diagram showing the selection of each mode in the color image forming apparatus of the fourth example. FIG. 16 is a view showing double-sided image forming conditions according to the third and the fourth modes of the fourth example, FIG. 16(A) is a view showing an example of double-sided image formation of the fourth example, and FIG. 16(B) is a view showing another example of the double-sided image formation of the fourth example. Members having the same functions and structures as those in the first example, are denoted by the same numerals.

As shown in FIG. 15, the first through the fourth modes of image forming methods of the color image forming apparatus are respectively selected. When the output order of pages is designated or the mode of face-down/face-up sheet discharge is selected by an external signal to designate the transfer order of image data, or by operations in an operation section of the apparatus main body, a single mode selected from a program P10, stored in a ROM, corresponding to the first mode, a program P12 corresponding to the second mode, a program P13 corresponding to the third mode, and a program P11 corresponding to the fourth mode, is read out in a RAM through a control section, and process control and operations of the color image forming apparatus are carried out.

A color image forming method according to the third mode will be described below.

A toner image receiving body 14a, stretched between a drive roller 14d and a driven roller 14e, is rotated around the shaft of the drive roller 14d in the direction shown by a dotted-line arrow in FIG. 13, and the following image formation is carried out while the toner image receiving body 14a is separated from the photoreceptor drum 10.

A photoreceptor drum 10, which is an image carrier, is provided inside with a cylindrical base body, and is also provided with a conductive layer, and a photoreceptor layer such as an a-Si layer, an organic photoreceptor layer (OPC), etc., on the outer periphery of the cited base body. The photoreceptor drum 10 is rotated clockwise as shown by an arrow in FIG. 14, while it is electrically grounded.

The photoreceptor drum 10, as the image forming body, is rotated, and in order to eliminate the hysteresis of the photoreceptor due to the previous printing, uniform exposure is carried out on the peripheral surface of the photoreceptor so as to discharge it by a uniform exposure device 121a, as the discharge means before charging, using, for example, a light emitting diode, so that electrical charges from the previous printing are eliminated.

The scorotron charger 11, as a charging means, charges (negative charging in the present example) the organic photoreceptor layer on the photoreceptor drum 10 by a corona discharge by using a control grid having a predetermined potential voltage, and a discharge electrode 11a, so that a uniform potential voltage is applied onto the photoreceptor drum 10.

After the peripheral surface of the photoreceptor drum 10 has been uniformly charged by the scorotron charger 11, image exposure based on the image signal is conducted by the exposure unit 121 as the image exposure means, and a latent image is formed on the photoreceptor drum 10.

The exposure unit 121, as an image exposure means, is composed of a semiconductor laser as a light emitting element, not shown, a rotational polygonal mirror 121b, which rotationally scans using the laser beam emitted from the semiconductor laser, and fθ lens 121c, a reflection mirror 121d, and the like. The rotational polygonal mirror 121b rotationally scans using the laser beam emitted from the semiconductor laser, not shown, and the image exposure is carried out according to the image signal in the primary scanning direction of the rotating photoreceptor drum 10 through the fθ lens 121c and the reflection mirror 121d, and thus the latent image is formed on the photoreceptor drum 10.

The developing devices 13 for each color which is a developing means in which developer, composed of toner such as yellow (Y), magenta (M), cyan (C) and black (K) toners, and carrier are respectively loaded, are provided around the photoreceptor drum 10, and initially, development for the first color (for example, yellow) is carried out by the developing sleeve 131.

The developing device 13 reversal develops the electrostatic latent image on the photoreceptor drum 10, which is formed by charge by the scorotron charger 11 and image exposure by the exposure unit 121, under no-contact condition, by a non-contact development method with application of a development bias voltage, by using toner having the same polarity as the charged polarity (in the present example, the photoreceptor drum is negatively charged, and the polarity of toner is also negative).

The developing device 13 is maintained to be in non-contact with the photoreceptor drum 10 by a roller, not shown, while keeping a predetermined gap, for example, of 100–1000 μm. During the developing operation by the developing device 13, a developing DC bias voltage, or further an AC voltage AC in addition to the DC voltage, is applied on the developing sleeve 131; jumping development is carried out by the one-component or two-component developer accommodated in the developing device; a DC bias voltage having the same polarity as toner (negative polarity in the present example), is applied on the negatively charged photoreceptor drum 10 in which a transparent conductive layer is grounded; and non-contact reversal development is carried out for adhering toner onto the exposure section.

After development for the first color has been completed, the apparatus enters into the second color (for example, magenta) image forming process. The photoreceptor drum 10 is uniformly re-charged by the scorotron charger 11, a latent image according to the second color image data is formed by the exposure unit 121. At this time, discharge by the uniform exposure means 121a, which has been conducted in the first color image forming process, is not carried out. The development by the second color developer, that is, magenta developer, is conducted by the developing sleeve 131. An AC bias voltage and a DC bias voltage are superimposed and applied between the developing sleeve 131 and the photoreceptor drum 10, and non-contact reversal development is carried out.

The third color (cyan) and fourth color (black) image forming processes are carried out in the same manner as the second color, and 4 color toner images are superimposed and developed on the photoreceptor drum 10 (the toner image forming means).

By the image forming processes described above, the superimposed color toner image, as the reverse image, is formed on the photoreceptor drum 10, employed as the image forming body (the first image carrier means). The toner image receiving body 14a is rotated around the axis of the driving roller 14d in the direction shown by a dotted-line arrow "b" in FIG. 14, and is in contact with the photoreceptor drum 10. When the photoreceptor drum 10 is rotated by 5 turns, the superimposed color toner image of the reverse image on the photoreceptor drum 10, is collectively transferred onto the toner image receiving body 14a (the second image carrier), which is provided being in contact with the photoreceptor drum 10, by the transfer device 14c by which the voltage, having a reverse polarity to the toner (positive polarity in the present example), is applied in the transfer area 14b. It is necessary to change image data so that the obverse image, formed at that time, forms a mirror image with respect to the reverse image on the image carrier.

After the superimposed color toner image of the reverse image on the photoreceptor drum 10 has been collectively transferred onto the toner image receiving body 14a, the toner image receiving body 14a is again rotated around the axis of the driving roller 14d in the direction shown by the dotted-line arrow "a" the in FIG. 14, and is separated from the photoreceptor drum 10.

Toner, remaining on the peripheral surface of the photoreceptor drum 10 after transfer, is discharged by an image carrier AC discharger 16. Then, the toner is moved to a cleaning device 19, and is cleaned by a cleaning blade 19a made of rubber material, which is in contact with the photoreceptor drum 10. Further, in order to eliminate the hysteresis of the photoreceptor due to the previous printing, the peripheral surface of the photoreceptor is discharged by a uniform exposure device 121a, using, for example, a light emitting diode, before charging; electrical charges at the previous printing is eliminated; and following that, the color image formation for the obverse image is conducted.

In the same manner as the color image forming process described above, the obverse image of the superimposed color toner image is formed on the photoreceptor drum 10.

Next, the obverse image formed on the photoreceptor drum 10 is synchronized with the reverse image formed on the toner image receiving body 14a in the transfer area 14b, and the toner image receiving body 14a is rotated around the axis of the driving roller 14d in the direction shown by the dotted-line arrow "b" in FIG. 14, so that it comes into contact with the photoreceptor drum 10.

The recording sheet P, which is a transfer material, is sent from the sheet feed cassette 15, which is a transfer material accommodation means, by the feed roller 15a, and fed and conveyed to the timing roller 15c by the sheet feed roller 15b.

The recording sheet P is sent to the transfer area 14b by the timing roller 15c in synchronization with the color toner image as the obverse image carried on the photoreceptor drum 10, and the color toner image as the reverse image carried on the toner image receiving body 14a. In this case, the recording sheet P is paper-charged to the same polarity as the toner by a paper charger 14f, is attracted to the toner image receiving body 14a, and is sent to the transfer area 14b. By paper-charging the recording sheet P to the same polarity as the toner, it prevents the recording sheet P from being attracted to each other by the toner image on the toner image receiving body, or the toner image on the image carrier, so that the toner image is not disturbed.

The obverse image on the peripheral surface of the photoreceptor drum 10 is collectively transferred onto the upper surface side of the recording sheet P by the transfer device 14c which applies voltage with a reverse polarity as the toner (in the present example, positive polarity) (the first transfer means). In this case, the reverse image on the peripheral surface of the toner image receiving body 14a is not transferred onto the recording sheet P, and exists on the toner image receiving body 14a. Next, the reverse image on the peripheral surface on the toner image receiving body 14a is collectively transferred onto the lower surface side of the recording sheet P, by a reverse surface transfer device 14g which has applied the voltage with the reverse polarity as the toner (in the present example, positive polarity), (the second transfer means).

Because a toner image for each color is superimposed on previous ones, it is preferable for the collective transfer, that the upper layer and the lower layer of the toner layer are charged by the same charging amount and with the same polarity. For this reason, the double-surface image formation, in which the polarity of the color toner image formed on the toner image receiving body 14a is reversed by corona charging, or in which the polarity of the color toner image formed on the image carrier is reversed by corona charging, is not preferable because the lower layer toner is not sufficiently charged to the same polarity, resulting in inadequate transfer.

It is preferable for an increase of the transfer property of the reversal image formation that the reversal development is repeated on the image carrier; the color toner image with the same polarity formed by superimposition, is collectively transferred onto the toner image receiving body 14a while the polarity is not changed; and next, it is collectively transferred onto the recording sheet P while the polarity is not changed. For the obverse image formation also, it is preferable that the reversal development is repeated on the image carrier, and the color toner image with the same polarity formed by superimposition, is collectively transferred onto the recording sheet P while the polarity is not changed, for an increase of the transfer property of the obverse image formation.

From the above description, in the color image formation, the double-surface image formation method is preferably adopted in which the color toner image is formed on the obverse surface of the transfer material by operating the first transfer means, and next, the color toner image is formed on the reverse surface of the transfer material by operating the second transfer means, by using the above-described image formation method for the obverse and reverse surfaces.

Toner image receiving body 14a is a 0.5–2.0 mm thick endless rubber belt, and is structured in 2 layers of a semiconductive base body, having resistance value of $10^8$–$10^{12}$ Ω·cm, which is formed of silicon rubber or urethane rubber, and a 5–50 μm thick fluorine coating layer as a toner filming prevention layer, formed on the rubber base body. This layer is also preferably semi-conductive. Instead of a rubber belt base body, 0.1–0.5 mm thick semi-conductive polyester, polystyrene, polyethylene, polyethylene terephthalate, etc., may also be used.

The recording sheet P, on the double-surfaces of which the color toner images have been formed, is discharged by a sheet separation AC discharger 14h for transfer material separation, separated from the toner image receiving body 14a, and is conveyed to a fixing device 17 as a fixing means, composed of 2 rollers respectively having a heater therein. Adhered toner on the obverse and reverse sides of the recording sheet P is fixed by application of heat and pressure between a fixing roller 17a and a pressure roller 17b; and the recording sheet P, on both sides of which images have been recorded, is sent by a sheet discharging roller 18 and discharged onto a tray provided outside the apparatus.

The above description is the image forming method by the third mode. When a large number of sheets, for example, n pages (n is an even number) are copied by the third mode, the following operations are carried out: as shown in FIG. 16(A), the color toner image on the odd-numbered page formed on the photoreceptor drum 10, and the color toner image on the even-numbered page formed on the toner image receiving body 14a respectively form double-sided images; image formation and discharging operations are conducted from the double-sided copy of n and (n−1)th pages, with the color toner image of n-th page facing downward; and the first copy sheet is discharged onto the uppermost surface, with the color toner image of the second page facing downward, and with the color toner image of the first page facing upward.

Toner remaining on the peripheral surface of the toner image receiving body 14a after transferring, is removed by a toner image receiving body cleaning device 14i. Toner remaining on the peripheral surface of the photoreceptor drum 10 after transferring is discharged by an image carrier AC discharger 16; is then moved into the cleaning device 19; scraped off by a cleaning blade 19a, made of a rubber material, being in contact with the photoreceptor drum 10, into the cleaning device 19; and is collected into a waste toner container, not shown, by a screw 19b. The photoreceptor drum 10, from the surface of which the remaining toner has been removed by the cleaning device 19, is uniformly charged by the scorotron charger 11, and then enters into the next image formation cycle.

In the similar manner, the image formation by the fourth mode is conducted as follows. When, for example, n pages (n is an even number) are copied by the fourth mode, the following method is adopted: as shown in FIG. 16(B), the color toner image on the even-numbered page formed on the photoreceptor drum 10, and the color toner image on the odd-numbered page formed on the toner image receiving body 14a respectively form double-sided images; image formation and discharging operations are conducted from the double-sided copy of the second and the first pages, with the color toner image of the first page facing downward; and the final copy sheet is discharged onto the uppermost surface, with the color toner image of the (n−1)th page facing downward, and with the color toner image of the n-th page facing upward.

The toner image receiving body 14a is again rotated around the axis of the driving roller 14d in the direction shown by the dotted-line arrow "a" in FIG. 14, and is separated from the photoreceptor drum 10. Toner remaining on the peripheral surface of the toner image receiving body 14a after transferring, is removed by a blade, which is in contact with the toner image receiving body 14a, of a toner image receiving body cleaning device 14i. Toner remaining on the peripheral surface of the photoreceptor drum 10 after transferring, is discharged by an image forming body AC discharge 16; then, is moved to the cleaning device 19; scraped off by a cleaning blade 19a made of a rubber material being in contact with the photoreceptor drum 10 into the cleaning device 19; and is collected in a waste toner container, not shown, by a screw 19b. The photoreceptor drum 10, from the surface of which the remained toner has been removed by the cleaning device 19, is uniformly charged by the scorotron charger 11, and then enters into the next image formation cycle.

The image formation by the third and fourth modes is carried out as described above. As described in Example 1, the first mode, in which the toner image, carried on the photoreceptor drum 10 (the first image carrier means) by the toner image forming means, is transferred and fixed onto the recording sheet P, and then the recording sheet p is discharged, and the second mode, in which the toner image on the photoreceptor drum 10 is temporarily transferred onto the toner image receiving body 14a (the second image carrier means), and the toner image, carried on the toner image receiving body 14a, is transferred and fixed onto the recording sheet P, and the recording sheet P is discharged, are respectively conducted in the color image forming process. Further, as a discharging method, respective discharging methods, similar to those described in FIGS. 3 through 5 in Example 1, are adopted according to each mode. Still further, the conveyance section 150, provided with the spur wheel 152 described in Example 2, may be provided between the toner image receiving body 14a and the fixing device 17.

EXAMPLE 5

Figure 17:
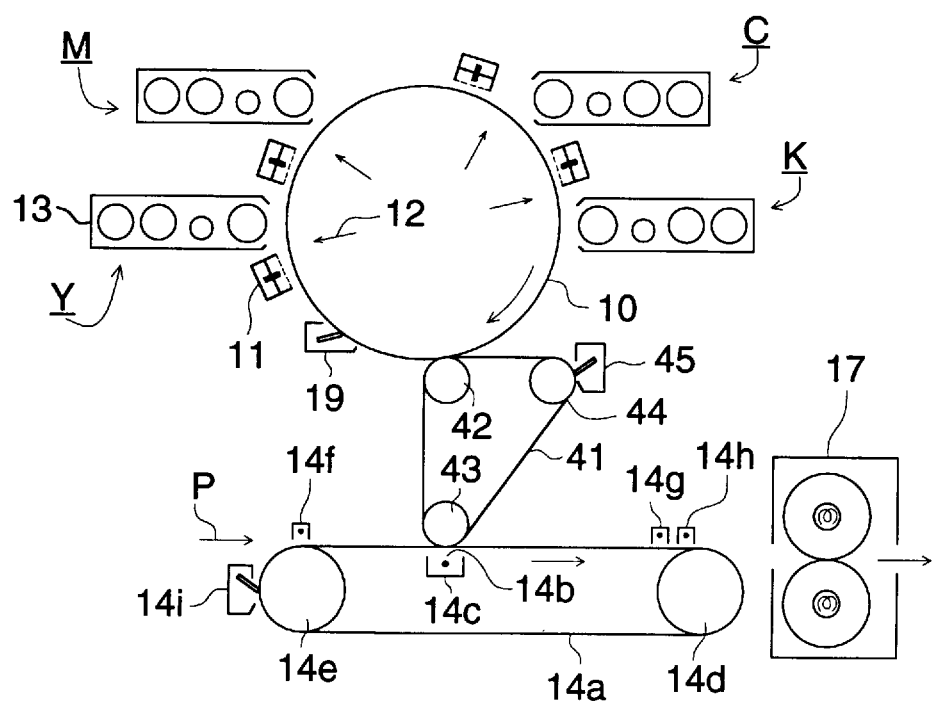
FIG. 17 is a sectional view of the structure of a color image forming apparatus of the fifth example of the image forming apparatus of the present invention.

Referring to FIG. 17, image forming processes and each mechanism of the fifth example of an image forming apparatus of the present invention will be described below. FIG. 17 is a sectional view of the structure of a color image forming apparatus of the fifth example of an image forming apparatus of the present invention. In the present example, a color toner image is formed onto the image carrier by the same image forming process as in Example 1, and the color toner image on the image carrier is transferred onto the toner image receiving body or the transfer material through an intermediate transfer body. Accordingly, the arrangement of the toner image receiving body and the feeding direction of the transfer material are reversed to those in Example 1. Members having the same functions and structures as those in Example 1, are denoted by the same numerals.

A transfer belt 41, as an intermediate transfer body, is provided opposite the photoreceptor drum 10, serving as the image carrier. The transfer belt 41 is stretched around the first roller 42 which serves as a transfer roller to press the intermediate transfer belt 41 onto the photoreceptor drum 10, the second roller 43 which serves to press the intermediate transfer belt 41 onto the toner image receiving body 14a in the transfer area 14b, and a back-up roller 44. Numeral 45 is an intermediate transfer belt cleaning device.

In the same manner as described in Example 1, a superimposed color toner image is formed on the peripheral surface of the photoreceptor drum 10 during a single rotation, by the scorotron charger 11 as a charging means, the exposure unit 12 as an image exposure means, and developing device 13 as a developing means (the toner image forming means).

By the toner image forming processes, a superimposed color toner image as the reverse surface image, is formed on the photoreceptor drum 10, which is the image carrier. After the superimposed color toner image, which is a reverse surface image, on the photoreceptor drum 10, has been temporarily transferred onto an intermediate transfer belt 41 (the first image carrier mean) by the transfer roller 42, it is collectively transferred onto a toner image receiving body 14a (the second image carrier means), which is stretched between the driving roller 14d and the driven roller 14e, and is provided close to the photoreceptor drum 10 or in contact with the drum, by the transfer device 14c for applying a voltage having reverse polarity to the toner, (positive polarity in the present example), in the transfer area 14b.

The obverse image of the superimposed color toner image is again formed on the photoreceptor drum 10, and is transferred onto the intermediate transfer belt 41. It is necessary to change image data so that the obverse image formed at the time, forms a mirror image with respect to the reverse image on the image carrier.

The recording sheet P, as the transfer material, is sent to the transfer area 14b, in synchronization with the color toner image as the obverse image, which has been formed on the photoreceptor drum 10, once transferred on the intermediate transfer belt 41 and is carried thereon, and the color toner image as the reverse image carried on the toner image receiving body 14a. In this case, the recording sheet P is paper-charged to the same polarity as the toner by a paper charger 14f, is attracted to the toner image receiving body 14a, and is sent to the transfer area 14b. By paper-charging the recording sheet P to the same polarity as the toner, the recording sheet P is prevented from being attracted by the toner image on the toner image receiving body, or the toner image on the image carrier, so that the toner image remains undisturbed.

The obverse image on the peripheral surface of the intermediate transfer belt 41 is collectively transferred onto the upper surface side of the recording sheet P by the transfer device 14c which applies voltage with the reverse polarity as the toner (in the present example, positive polarity), ( the first transfer means). In this case, the reverse image on the peripheral surface of the toner image receiving body 14a is not transferred onto the recording sheet P, and exists on the toner image receiving body 14a. Next, the reverse image on the peripheral surface on the toner image receiving body 14a is collectively transferred onto the lower surface of the recording sheet P, by a reverse surface transfer device 14g which has applied a voltage with the reverse polarity as the toner (in the present example, positive polarity), (the second transfer means).

Toner image receiving body 14a is a 0.5–2.0 mm thick endless rubber belt, and is structured of 2 layers of a semiconductive base body, having a resistance value of $10^8$–$10^{12}$ Ω·cm, which is formed of silicon rubber or urethane rubber, and a 5–50 μm thick fluorine coating layer as a toner filming prevention layer, formed outside the rubber base body. This layer is also preferably semi-conductive. Instead of the rubber belt base body, 0.1–0.5 mm thick semi-conductive polyester, polystyrene, polyethylene, polyethylene terephthalate, etc., may also be used.

The recording sheet P, on both surfaces of which the color toner image has been formed, is discharged by a sheet separation AC discharger 14h for transfer material separation, separated from the toner image receiving body 14a, and is conveyed to a fixing device 17 as a fixing means, composed of 2 rollers respectively having a heater therein. Adhered toner on the obverse and reverse sides of the recording sheet P is fixed by application of heat and pressure between two rollers; the obverse and reverse images are recorded on the recording sheet P, and the sheet P is discharged onto a tray provided outside the apparatus.

Toner remaining on the peripheral surface of the toner image receiving body 14a after transferring in the present example, is removed by a blade of a toner image receiving body cleaning device 14i, which can be moved into contact with and can be removed from the toner image receiving body 14a.

Selection of the first and second modes, and the third and fourth modes, which have been described in Examples 1 and 4, is also carried out in the present example, and respective discharging methods, similar to those described in FIGS. 3 to 5 in Example 1 and FIG. 16 in Example 4, are adopted according to each mode. Further, the conveyance section 150, provided with the spur wheel 152 described in Example 2, may be provided between the toner image receiving body 14a and the fixing device 17.

Although the present invention was described using the color image forming apparatus, it can, of course, be also applied for a monochromatic image forming apparatus. Further, the present invention is not limited to the above-described system, but also includes variations by which double-sided images are formed. For example, the method in which processing conditions and image data processing conditions are changed with respect to the obverse surface and the reverse surface, as described above, can also be applied to the method, disclosed in Japanese Patent Publication No. 28740/1979, in which, relating to the reverse image, after the polarity of toner has been reversed, toner images are simultaneously transferred onto both surfaces of the transfer material, and also for the tandem method, disclosed in Japanese Patent Publication Open to Public Inspection Nos. 180969/1988, 298255/1988, 44457/1989, etc., so that the double-sided image formation in which the image density and the color tone are properly adjusted, can be carried out.

Next, examples to attain the second object of the present invention will be described. In an image forming apparatus of these examples, in the case where an image is formed onto the transfer material in a longitudinal feeding mode, a means to reverse the image data to the primary scanning direction with respect to the obverse image, is provided, when the reverse image is formed onto the transfer material. Further, when the image is formed on the transfer material in a lateral feeding mode, a means to reverse the image data to the subsidiary scanning direction with respect to the obverse image, is provided, in the case where the reverse image is formed on the transfer material. Herein, the longitudinal feeding mode means the case in which the longitudinal direction of the image is the same as the conveyance direction of the transfer material as shown in FIG. 9(a), and the lateral feeding mode means the case in which the longitudinal direction of the image is perpendicular to the conveyance direction of the transfer material as shown in FIG. 9(b). That is, in the image forming apparatus of the present invention, when the image is formed on the transfer material in the longitudinal feeding or the lateral feeding, a means to reverse the image data to the primary scanning direction or the subsidiary scanning direction with respect to the obverse image which is formed in the normal mode, is provided, in the case where the reverse image is formed on the transfer material. When the obverse image is formed on the transfer material, a means to reverse the image data to the primary scanning direction or the subsidiary scanning direction with respect to the reverse image which is formed in the normal mode, is provided, which provides the same effect as above.

EXAMPLE 6

Figure 18:
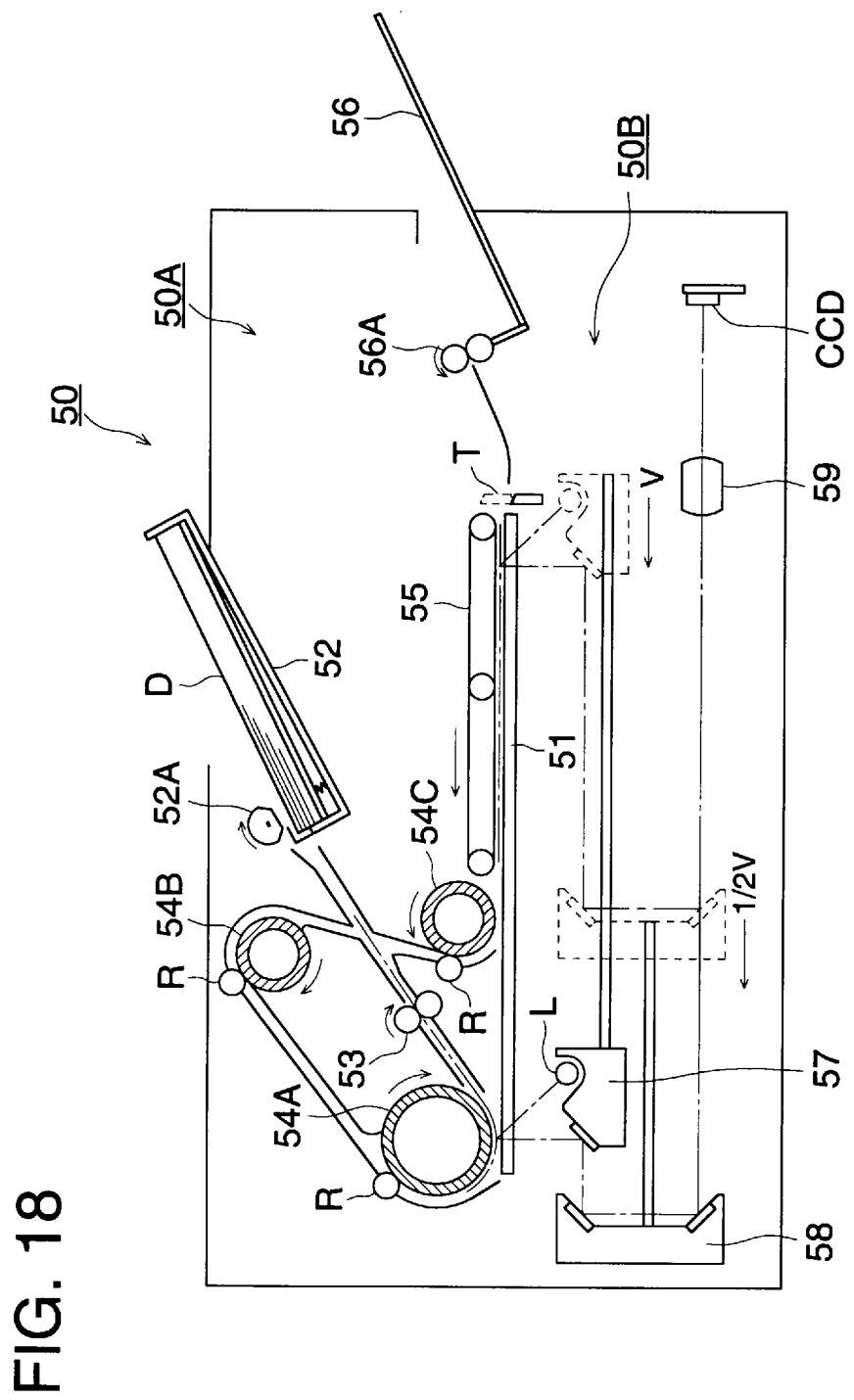
FIG. 18 a view showing the structure of an image reading apparatus for reading a longitudinal feeding image or a lateral feeding image in the sixth and seventh examples.

When a document image is in the longitudinal feeding mode as shown in FIG. 20(A), in the scanning optical system 50B as shown in FIG. 18, the first mirror unit 57 and the second mirror unit 58 are moved from the initial scanning position, shown by a broken-line in FIG. 18, to a position shown by a solid line in a left portion in FIG. 18, over a predetermined scanning range, and temporarily stops while the image surface and an image pick-up element CCD are in optically conjugated relationship with respect to an image formation lens 59.

The reverse image of the document D, moving at a line speed V, is read from the leading edge of the document D by the pick-up element CCD of the scanning optical system 50B at a fixed position, in which the first mirror unit 57 and the second mirror unit 58 are set at a position shown by a solid line, at a peripheral portion of a conveyance drum 54A. When the reverse image has been read out, the first mirror unit 57 and the second mirror unit 58 return to the initial scanning position, shown by a broken line, in the scanning optical system 50B. At a time when the document D, with the obverse image facing downward, comes into contact with a stopper plate T and stops on a platen glass 51, the first mirror unit 57 scans the image at speed V, and the second mirror unit scans the image at speed V/2 in the arrowed direction, and thereby, an optical path length, which is in an optically conjugated relationship, is maintained, and the obverse image is read from the leading edge of the document D, which is at the stopped position, by the image pick-up element CCD.

Thus, an image reading process of the longitudinal feeding image is carried out by an image reading apparatus 50. After the reverse image of the document has been read, the obverse image is read. When the reverse image has been read, the above-described image forming process of the color image forming apparatus starts. Initially, the toner image of the read reverse image is formed on the first image carrier means (the photoreceptor drum 10), and then, the toner image on the reverse surface is transferred onto the second image carrier means (the toner image receiving body 14a). Following that, the toner image of the read obverse image is formed on the first image carrier means, onto which transfer has been completed, and on which cleaning has also been completed. Then, the toner image of the obverse image and the toner image of the reverse image are transferred onto the transfer material (the recording sheet P) by the first transfer means (the transfer device 14c) and the second transfer means (the reverse surface transfer device 14g), and the obverse and reverse surface toner images of the transfer material are fixed by the fixing device 17.

Figure 20:
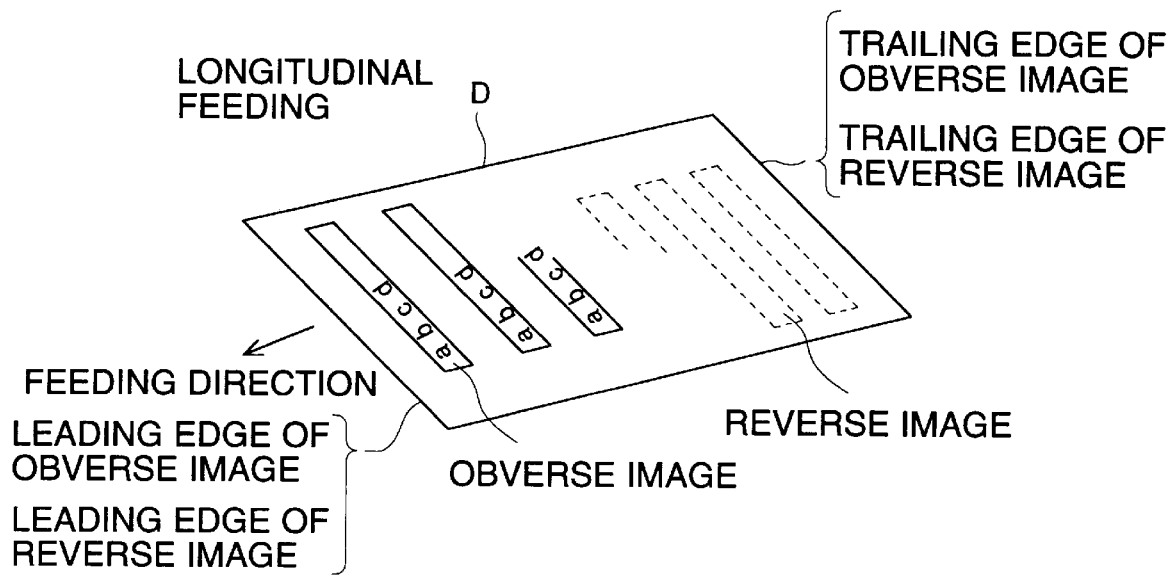
FIGS. 20(A) and 20(B) are perspective views showing an example of image patterns of both a longitudinal feeding image and a lateral feeding image.
Figure 20:
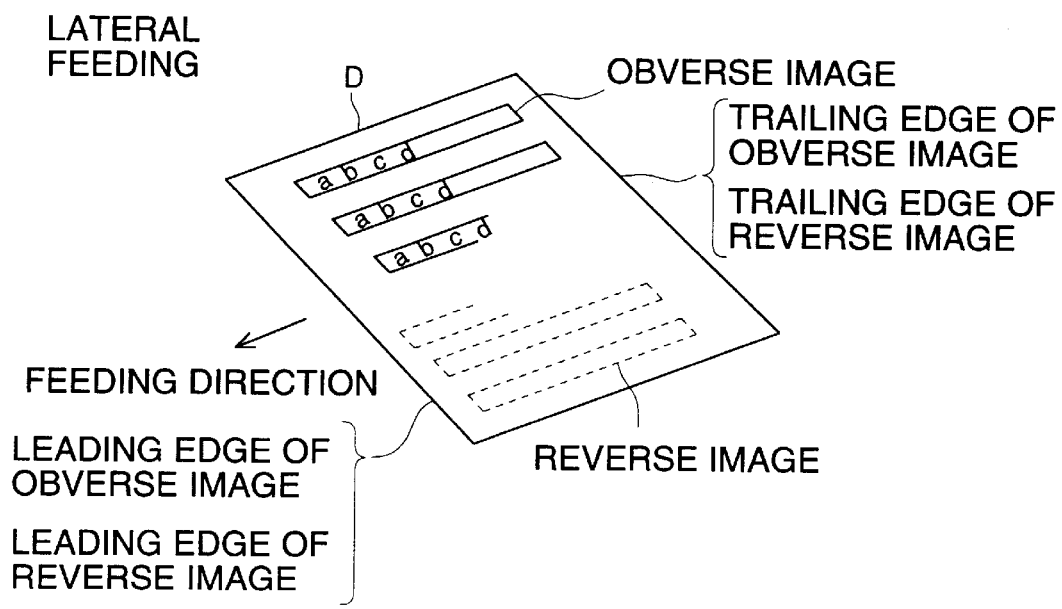

As a result, the images on the obverse and reverse surfaces of the document D are respectively formed on the obverse and reverse surfaces of the recording sheet p, in which the leading edge of each image is aligned in the same direction. When image data of the reverse surface image is outputted to the apparatus main body, the output of each line is reversed by an electrical reversing means in the primary scanning direction, so that the image signal is outputted from the reverse direction. By this structure, the normal image, having the same relationship as the laterally normal document image, as shown in FIG. 20 (A), is formed on the reverse surface of the recording sheet P.

When the obverse image has been read in the image reading apparatus 50, the first mirror unit 57 and the second mirror unit 58 move again to the position, shown by a solid line, in the left portion in the drawing, and are ready for the reverse image reading of the next document.

EXAMPLE 7

When a document image is in the lateral feeding mode as shown in FIG. 20(B), in the scanning optical system 50B as shown in FIG. 18, the first mirror unit 57 and the second mirror unit 58 are moved from the initial scanning position, shown by a broken-line in FIG. 18, to a position shown by a solid line in a left portion in FIG. 18, over a predetermined scanning range, and temporarily stops while the image surface and an image pick-up element CCD are in the optically conjugated relationship with respect to the image formation lens 59.

The reverse image of the document D, moving at a line speed V, is read from the trailing edge of the document D by the pick-up element CCD of the scanning optical system 50B at a fixed position, in which the first mirror unit 57 and the second mirror unit 58 are set at a position shown by a solid line, at a peripheral portion of a conveyance drum 54A. When the reverse image has been read out, the first mirror unit 57 and the second mirror unit 58 return to the initial scanning position, shown by a broken line, in the scanning optical system 50B. At a time when the document D, with the obverse image facing downward, comes into contact with a stopper plate T and stops on a platen glass 51, the first mirror unit 57 moves at speed V, and the second mirror unit moves at speed V/2 in the arrowed direction, and the obverse image is read from the leading edge of the document D by the image pick-up element CCD. That is, the reverse image is read such that it is reversed in the subsidiary scanning direction.

Thus, an image reading process of the lateral-feeding image is carried out by an image reading apparatus 50. After the reverse image of the document has been read, the obverse image is read. When the reverse image has been read, the above-described image forming process of the color image forming apparatus starts. Initially, the toner image of the read reverse image is formed on the first image carrier means (the photoreceptor drum 10), and then, the toner image on the reverse surface is transferred onto the second image carrier means (the toner image receiving body 14a). Following that, the toner image of the read obverse image is formed on the first image carrier means, onto which transfer has been completed, and on which cleaning has also been completed. Then, the toner image of the obverse image and the toner image of the reverse image are transferred onto the transfer material (the recording sheet P) by the first transfer means (the transfer device 14c) and the second transfer means (the reverse surface transfer device 14g), and the obverse and reverse surface toner images of the transfer material are fixed by the fixing device 17.

As a result, the images on the obverse and reverse surfaces of the document D are respectively formed on the obverse and reverse surfaces of the recording sheet p, such that each image is formed at the same lateral position. Further, image data of the reverse image is read such that it is reversed in the subsidiary scanning direction with respect to the obverse image. Based on this, the image signal is outputted such that the reverse surface image is outputted from the direction reverse to the obverse image in the subsidiary scanning direction, and the normal image, having the same relationship as the longitudinally normal document image, as shown in FIG. 20(B), is recorded on the reverse surface of the recording sheet P.

When the obverse image has been read in the image reading apparatus 50, the first mirror unit 57 and the second mirror unit 58 move again to the position, shown by a solid line in the left portion in the drawing, and are ready for the reverse image reading of the next document D.

EXAMPLE 8

Discrimination whether the document feeding direction is the longitudinal feeding direction or the lateral feeding direction, is conducted as follows.

Figure 19:
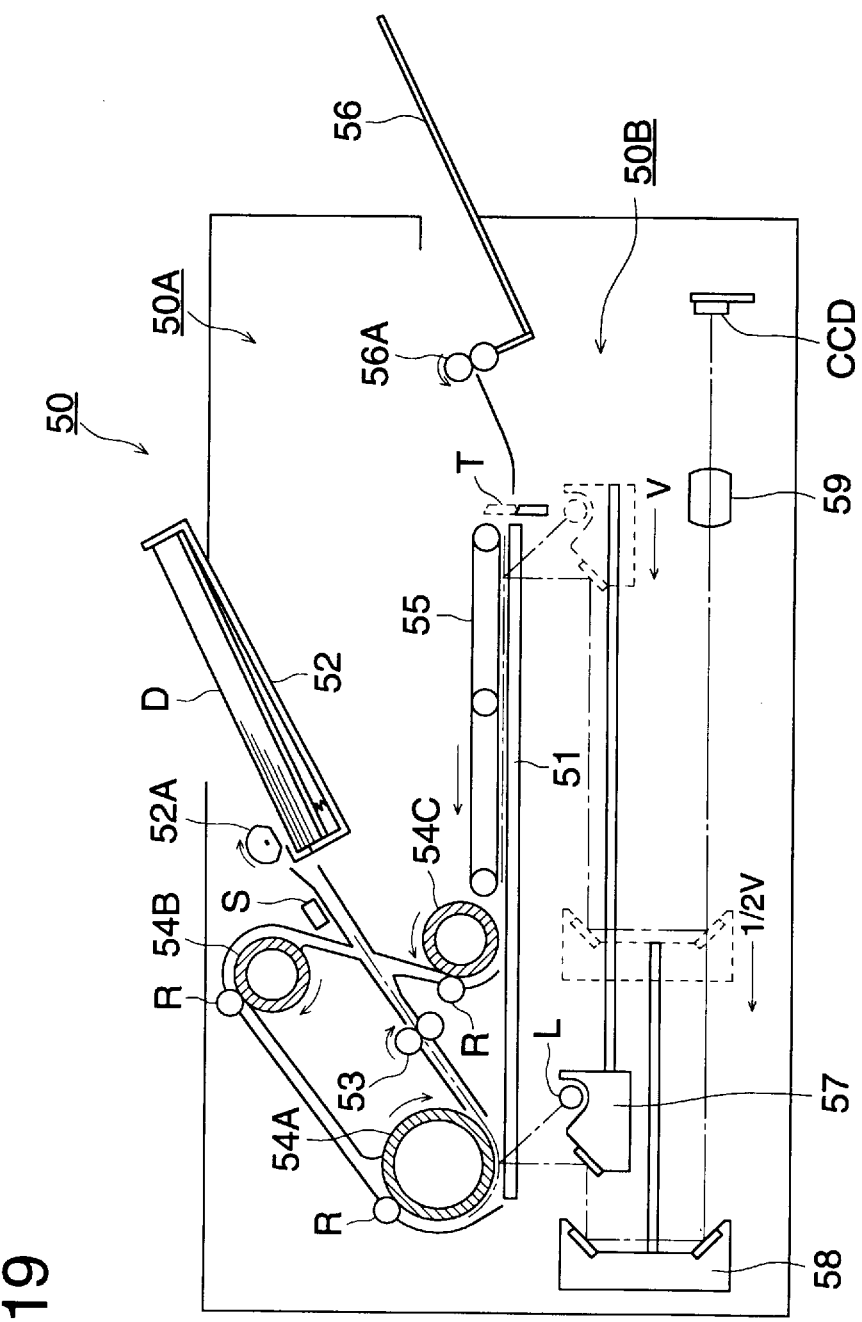
FIG. 19 is a view showing the structure of an image reading apparatus, which is provided with a discrimination means, and which serves for reading a longitudinal feeding image or a lateral feeding image, in the eighth examples.

(1) Regarding documents, stacked on a document holder 52 as shown in FIG. 19, when the length in the longitudinal direction is larger than that in the lateral direction with respect to the conveyance direction, it is judged to be the longitudinal feeding mode; and when the length in the longitudinal direction is smaller than that in the lateral direction with respect to the conveyance direction, it is judged to be the lateral feeding mode.

A longitudinal/lateral feeding detection sensor S, composed of a plurality of photo-sensors, is provided close to the document holder 52, along the document conveyance path and perpendicular to the conveyance path. By reading the obverse image pattern of the document, the longitudinal feeding mode or the lateral feeding mode, is judged. In the case of character images, in the longitudinal feeding mode, the character portion passes through the longitudinal/lateral feeding detection sensor S in the shape of lateral stripes with respect to the white background, as shown in FIG. 20(A). In the lateral feeding mode, the character portion passes through the longitudinal/lateral feeding detection sensor S in the shape of longitudinal stripes with respect to the white background, as shown in FIG. 20(B). Accordingly, the white background portion is detected to be long in the primary scanning direction or in the subsidiary scanning direction, so that the longitudinal feeding mode or the lateral feeding mode is easily discriminated. That is, the discrimination is conducted based on the length and frequency of this white background or a black character portion (the image portion).

Further, an image of image data can also be discriminated from image data itself, whether it is a longitudinal feeding image, or a lateral feeding image. For example, in a printer, the longitudinal feeding image or the lateral feeding image can be discriminated based on sheet data and layout data including in image data, sent from a computer.

Figure 21:
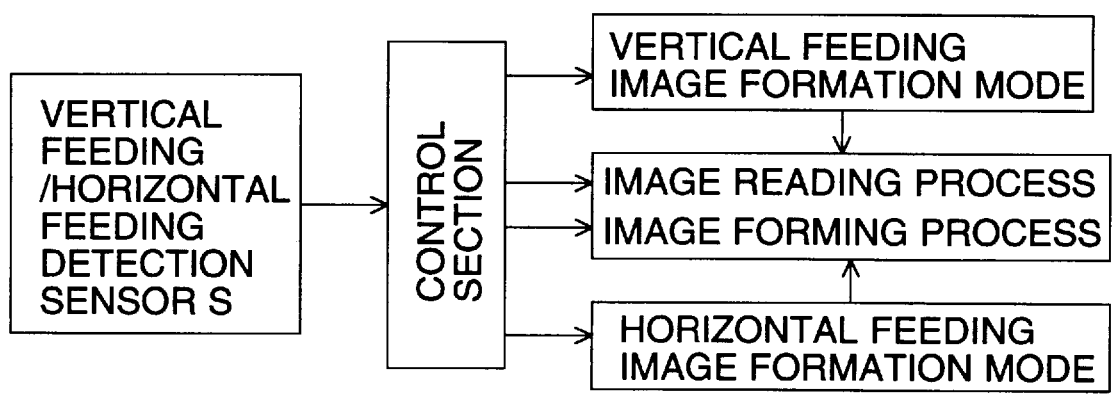
FIG. 21 is a circuit diagram to switch modes in the eighth example.

FIG. 21 shows a circuit diagram in which modes are switched by detection of the longitudinal feeding or the lateral feeding. When the longitudinal feeding of the document is detected by the longitudinal/lateral feeding detection sensor S, a control section controls the image reading process and the image formation process by the longitudinal feeding image formation mode. Further, when the lateral feeding of the document is detected by the longitudinal/lateral feeding detection sensor S, a control section controls the image reading process and the image formation process by the lateral feeding image formation mode.

In the longitudinal feeding image formation mode, in the scanning optical system 50B, the first mirror unit 57 and the second mirror unit 58 are moved from the initial scanning position, shown by broken-lines of 57A and 58A in FIG. 19, to a position shown by a solid line in a left portion in FIG. 19, over a predetermined scanning range, and temporarily stops while the image surface and an image pick-up element CCD are maintained in the optically conjugated relationship with respect to the image formation lens 59.

The reverse image of the document D, moving at a line speed V, is read from the leading edge of the document D by the pick-up element CCD of the scanning optical system 50B at a fixed position, in which the first mirror unit 57 and the second mirror unit 58 are set at a position shown by a solid line, at a peripheral portion of a conveyance drum 54A. When the reverse image has been read out, the first mirror unit 57 and the second mirror unit 58 return to the initial scanning position, shown by a broken line, in the scanning optical system 50B. At a time when the document D, with the obverse image facing downward, comes into contact with a stopper plate T and stops on a platen glass 51, the first mirror unit 57 scans at speed V, and the second mirror unit scans at speed V/2 in the arrowed direction (in the left direction in the drawing). Thereby, an optical path length, which is in an optically conjugated relationship, is maintained, and the obverse image is read from the leading edge of the document D, which is at the stopped position, by the image pick-up element CCD.

Thus, an image reading process of the longitudinal feeding image is carried out by an image reading apparatus 50. After the reverse image of the document has been read, the obverse image is read. When the reverse image has been read, the above-described image forming process of the color image forming apparatus starts. Initially, after the read reverse image has been image processed in the primary scanning direction, the toner image of the reverse image is formed on the first image carrier means (the photoreceptor drum 10); and then, the toner image on the reverse surface is transferred onto the second image carrier means (the toner image receiving body 14a). Following that, the toner image of the read obverse image is formed on the first image carrier means, onto which transfer has been completed, and on which cleaning has also been completed. Then, the toner image of the obverse image and the toner image of the reverse image are transferred onto the transfer material (the recording sheet P) by the first transfer means (the transfer device 14c) and the second transfer means (the reverse surface transfer device 14g), and the obverse and reverse surface toner images of the transfer material are fixed by the fixing device 17.

As a result, the images on the obverse and reverse surfaces of the document D are respectively formed on the obverse and reverse surfaces of the recording sheet P, such that the leading edge of each image is facing in the same direction. Further, when image data of the reverse surface image is outputted to the apparatus main body, the primary scanning direction is reversed by an electrical reversing means, and the image signal is outputted from the reversed direction. By this structure, the normal image, having the same relationship as a laterally normal document image, as shown in FIG. 20 (A), is formed on the reverse surface of the recording sheet P.

When the obverse image has been read in the image reading apparatus 50, the first mirror unit 57 and the second mirror unit 58 move again to the position, as shown by a solid line in the left portion in the drawing, and are ready for the reverse image reading of the next document D.

In the lateral-feeding image formation mode, in the above-described scanning optical system 50B, the first mirror unit 57 and the second mirror unit 58 are moved from the initial scanning position, shown by a broken-line in the drawing, to a position shown by a solid line in the left portion in FIG. 19, over a predetermined scanning range, and temporarily stops while the image surface and an image pick-up element CCD are maintained in an optically conjugated relationship with respect to the image formation lens 59.

The reverse image of the document D, moving at line speed V, is read from the trailing edge of the document D by the pick-up element CCD of the scanning optical system 50B at a fixed position, in which the first mirror unit 57 and the second mirror unit 58 are set at a position shown by the solid line, at a peripheral surface portion of the conveyance drum 54A. When the reverse image has been read out, the first mirror unit 57 and the second mirror unit 58 return to the initial scanning position, shown by a broken line, in the scanning optical system 50B. At a time when the document D, with the obverse image facing downward, comes into contact with a stopper plate T and stops on a platen glass 51, the first mirror unit 57 moves at speed V, and the second mirror unit 58 moves at speed V/2 in the arrowed direction, and the obverse image is read from the leading edge of the document D by the image pick-up element CCD. In this case, image data of the reverse image is read at the time of reading in such a manner that it is reversed in the subsidiary scanning direction.

Thus, an image reading process of the lateral-feeding image is carried out by the image reading apparatus 50. After the reverse image of the document has been read, the obverse image is read. When the reverse image has been read, the above-described image forming process of the color image forming apparatus starts. Initially, the toner image of the read reverse image is formed on the first image carrier means (the photoreceptor drum 10), and then, the toner image on the reverse surface is transferred onto the second image carrier means (the toner image receiving body 14a). Following that, the toner image of the read obverse image is formed on the first image carrier means, onto which transfer has been completed, and on which cleaning has also been completed. Then, the toner image of the obverse image and the toner image of the reverse image are transferred onto the transfer material (the recording sheet P) by the first transfer means (the transfer device 14c) and the second transfer means (the reverse surface transfer device 14g), and the obverse and reverse surface toner images on the transfer material are fixed by the fixing device 17.

As a result, the images on the obverse and reverse surfaces of the document D are respectively formed on the obverse and reverse surfaces of the recording sheet p, such that each image is formed at the same lateral position. Further, image data of the reverse image is read such that it is reversed in the subsidiary scanning direction with respect to the obverse image. Based on this, the image signal is outputted such that the image signal of the reverse surface image is outputted from the direction reverse to the obverse image in the subsidiary scanning direction, and the normal image, having the same relationship as the longitudinally normal document image, as shown in FIG. 20(B), is recorded on the reverse surface of the recording sheet P.

When the obverse image has been read in the image reading apparatus 50, the first mirror unit 57 and the second mirror unit 58 move again to the position, shown by a solid line in the left portion in the drawing, and are ready for the reverse image reading of the next document D.

As a document feeding mechanism to the document holder, when the common moving-optical system is used for both the obverse and reverse surfaces, it is necessary to change the document reading method. That is, the document is always read from the leading edge of each image, with respect to the longitudinal feeding and the lateral feeding. Further, when the image is read from the memory in which the document has been stored, and is outputted, the document discriminating means is in accordance with the output designation of the double-side or single side copy, or the longitudinal or lateral feeding, or the edition format, and therefore, the mode can be easily switched.

In the present example, in the case where the document is read from the leading edge, the structure of the present example is preferable because discharged sheets are collated when the transferred transfer sheet is discharged with its face down from the fixing device, as shown in the image forming apparatus in FIG. 14. Further, in the case where the document is read from the trailing edge, the structure is preferable because discharged sheets are collated when the transferred transfer sheet is discharged with its face up from the fixing device, as shown in FIGS. 1 and 17.

According to the present invention, in either case of the longitudinal feeding image or the lateral feeding image, a double-sided image forming apparatus is provided in which the obverse and reverse images are efficiently transferred respectively onto the obverse and reverse surfaces of the transfer material with the same conditions as the document, and the obverse and reverse images can be simultaneously fixed and recorded, thereby higher speed printing can be performed.

Further, according to the present invention, a double-sided image forming apparatus is provided, which does not require the operator to consider whether the image is a longitudinal feeding image or a lateral feeding image, and which is extremely convenient for use, and can conduct higher speed printing.

What is claimed is:

1. An image forming apparatus for forming images corresponding to image data, comprising:

an image carrier;

a toner image forming means for forming a toner image on said image carrier in correspondence with the image data in a primary scanning direction and a subsidiary scanning direction;

a toner image receiving body for receiving said toner image from said toner image forming means and for carrying said toner image;

a first transfer means for transferring said toner image on said image carrier onto one side surface of a transfer material;

a second transfer means for transferring said toner image on said toner image receiving body onto an other side surface of said transfer material;

a fixing means for fixing said toner image, being transferred onto said transfer material, on said transfer material;

a control means for controlling said toner image forming means; and a discriminating means for discriminating whether a given image, corresponding to said image data, is longitudinally formed on said transfer material or laterally formed on said transfer material in relation to a conveyance direction of said transfer material;

wherein said control means controls said toner image forming means so as to change a direction of said given image to the reverse direction, in relation to one of said primary scanning direction and said subsidiary scanning direction, corresponding to the result of discrimination with said discriminating means when said toner image is formed on said other side surface of said transfer material.

2. The apparatus of claim 1, wherein said control means controls said toner image forming means so as to change said direction of said given image to the reverse direction, in relation to said primary scanning direction, when said discriminating means discriminates that said given image is longitudinally formed on said transfer material.

3. The apparatus of claim 1, wherein said control means controls said toner image forming means so as to change said direction of said given image to the reverse direction, in relation to said subsidiary scanning direction, when said discriminating means discriminates that said given image is laterally formed on said transfer material.

4. The apparatus of claim 1, wherein said discriminating means discriminates that said given image is longitudinally formed on said transfer material when a longitudinal direction of said given image is the same as said conveyance direction of said transfer material.

5. The apparatus of claim 1, wherein said discriminating means discriminates that said given image is laterally formed on said transfer material when a longitudinal direction of said given image is perpendicular to said conveyance direction of said transfer material.

6. The apparatus of claim 1, further comprising:

a document scanning means, having a primary scanning direction and a subsidiary scanning direction, for scanning images of documents so as to obtain said image data;

wherein said discriminating means discriminates whether said given image, corresponding to one of said documents, is longitudinally formed on said transfer material or laterally formed on said transfer material in relation to a conveyance direction of said transfer material in accordance with lengths of said documents in said primary scanning direction and said subsidiary scanning direction of said document scanning means.

7. The apparatus of claim 1, further comprising:

a document scanning means for scanning images of documents so as to obtain said image data;

wherein said discriminating means discriminates whether said given image, corresponding to one of said documents, is longitudinally formed on said transfer material or laterally formed on said transfer material in relation to a conveyance direction of said transfer material by detecting a white background portion and a black character portion of said documents.

8. The apparatus of claim 1, wherein said discriminating means discriminates whether said given image, corresponding to one of said plurality of pages of said image data, is longitudinally formed on said transfer material or laterally formed on said transfer material in relation to a conveyance direction of said transfer material in accordance with at least one of sheet data and layout data, which are included in said image data.

* * * * *